United States Patent
Tatsuwaki et al.

(10) Patent No.: US 11,827,089 B2
(45) Date of Patent: Nov. 28, 2023

(54) VEHICLE EQUIPPED WITH BATTERY PACK

(71) Applicant: Honda Motor Co., Ltd., Tokyo (JP)

(72) Inventors: Masaaki Tatsuwaki, Saitama (JP); Ken Yasui, Saitama (JP); Satoru Kawabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 63 days.

(21) Appl. No.: 17/511,534

(22) Filed: Oct. 26, 2021

(65) Prior Publication Data
US 2022/0144064 A1 May 12, 2022

(30) Foreign Application Priority Data
Nov. 11, 2020 (JP) .................. 2020-188169

(51) Int. Cl.
| | | |
|---|---|---|
| *B60K 11/04* | (2006.01) | |
| *B60K 1/04* | (2019.01) | |
| *H01M 50/202* | (2021.01) | |
| *H01M 50/298* | (2021.01) | |
| *H01M 50/242* | (2021.01) | |

(52) U.S. Cl.
CPC .......... *B60K 1/04* (2013.01); *H01M 50/202* (2021.01); *H01M 50/242* (2021.01); *H01M 50/298* (2021.01); *B60K 2001/0438* (2013.01)

(58) Field of Classification Search
CPC .............. B60K 1/04; B60K 2001/0438; B60K 2001/0433; H01M 50/202; H01M 50/242; H01M 50/298; H01M 50/249; H01M 50/262
See application file for complete search history.

(56) References Cited

U.S. PATENT DOCUMENTS

| | | |
|---|---|---|
| 7,654,352 B2 | 2/2010 | Takasaki et al. |
| 8,561,743 B2 | 10/2013 | Iwasa et al. |
| 8,993,142 B2 * | 3/2015 | Sakai ............... B60L 1/003 |
| | | 180/68.5 |
| 9,034,502 B2 | 5/2015 | Kano et al. |
| 10,737,729 B2 * | 8/2020 | Erlacher ............... B60K 1/04 |
| 10,780,923 B2 | 9/2020 | Caliskan et al. |

FOREIGN PATENT DOCUMENTS

| | | |
|---|---|---|
| JP | 2009137408 | 6/2009 |
| JP | 2012214065 | 11/2012 |
| JP | 2020015332 | 1/2020 |
| WO | 2010098271 | 9/2010 |

OTHER PUBLICATIONS

"Office Action of Japan Counterpart Application", dated Jun. 20, 2023, with English translation thereof, pp. 1-11.

* cited by examiner

*Primary Examiner* — James A English
*Assistant Examiner* — James J Triggs
(74) *Attorney, Agent, or Firm* — JCIPRNET

(57) ABSTRACT

Provided is a vehicle equipped with a battery pack. A vehicle equipped with a battery pack includes a battery pack under a floor of the vehicle. The battery pack is provided with a battery module. In the battery module, a plurality of batteries are arranged vertically with the longitudinal direction directed toward a front-rear direction of the vehicle body. The battery is formed by stacking a plurality of battery cells in the front-rear direction of the vehicle body. A center of gravity of pack of the battery pack is arranged at the rear of a center of gravity of vehicle of the entire vehicle in the vehicle body.

17 Claims, 13 Drawing Sheets

VEHICLE EQUIPPED WITH BATTERY PACK

CROSS-REFERENCE TO RELATED APPLICATION

This application claims the priority benefit of Japan application serial no. 2020-188169, filed on Nov. 11, 2020. The entirety of the above-mentioned patent application is hereby incorporated by reference herein and made a part of this specification.

BACKGROUND

Technical Field

The disclosure relates to a vehicle equipped with a battery pack.

Related Art

As a vehicle equipped with a battery pack, for example, a vehicle has been known in which a longitudinal frame of a vehicle body is extended in a front-rear direction of the vehicle body, a battery is arranged vertically along the longitudinal frame, and a cross member of the vehicle body is fixed to the longitudinal frame above the battery in a state of being extended in a vehicle width direction. According to the vehicle equipped with a battery pack, the rigidity and strength of the vehicle body can be secured by fixing the cross member to the longitudinal frame (for example, see Patent literature 1).

LITERATURE OF RELATED ART

Patent Literature

[Patent literature 1] U.S. Pat. No. 10,780,923

However, in the vehicle equipped with a battery pack described in Patent literature 1, because a space between the longitudinal frame and the battery is small, for example, the longitudinal frame may be deformed (crushed) by a load input to the longitudinal frame due to a side collision, and the battery may be damaged. In order to solve this problem, for example, a solution that suppresses the deformation of the longitudinal frame caused by the load of the side collision by reinforcing the longitudinal frame is considered. However, the reinforcement of the longitudinal frame causes an increase in the weight of the vehicle body.

SUMMARY

According to an embodiment, the disclosure provides a vehicle equipped with a battery pack that can suppress deformation of the battery pack without increasing the weight of a vehicle body.

According to an embodiment, the disclosure proposes a vehicle equipped with a battery pack according to the disclosure includes, under the floor of the vehicle (for example, a vehicle Ve equipped with a battery pack in the embodiment), a battery pack (for example, a battery pack 20 in the embodiment) having a plurality of batteries (for example, batteries 85 in the embodiment) arranged vertically with the longitudinal direction directed toward a front-rear direction of a vehicle body. In the battery pack, a center of gravity of pack (for example, a center of gravity of pack Gi in the embodiment) is arranged at the rear of a center of gravity of vehicle (for example, a center of gravity of vehicle Gb in the embodiment) of the entire vehicle in the vehicle body.

DESCRIPTION OF THE EMBODIMENTS

Figure 1:
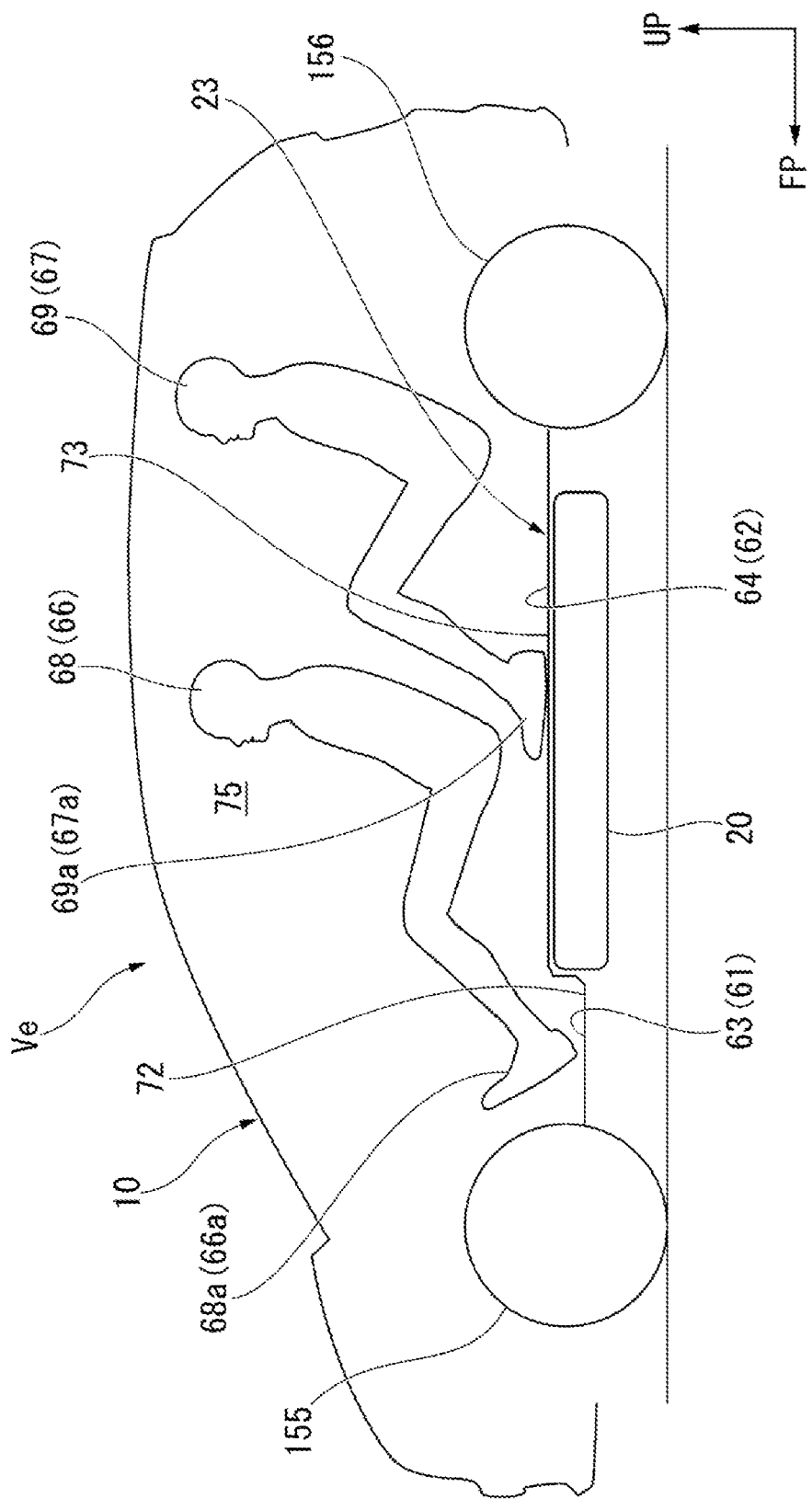
FIG. 1 is a schematic view of a vehicle equipped with a battery pack according to an embodiment of the disclosure as viewed from the left side.

Hereinafter, a vehicle equipped with a battery pack according to an embodiment of the disclosure is described with reference to the drawings. In the drawing, an arrow FR indicates a front side of the vehicle, an arrow UP indicates an upper side of the vehicle, and an arrow LH indicates a left side of the vehicle. In addition, the vehicle equipped with a battery pack has a substantially symmetrical configuration. Thus, hereinafter, the left and right constituent members are described with the same reference signs.

<Vehicle Main Body>

Figure 2:
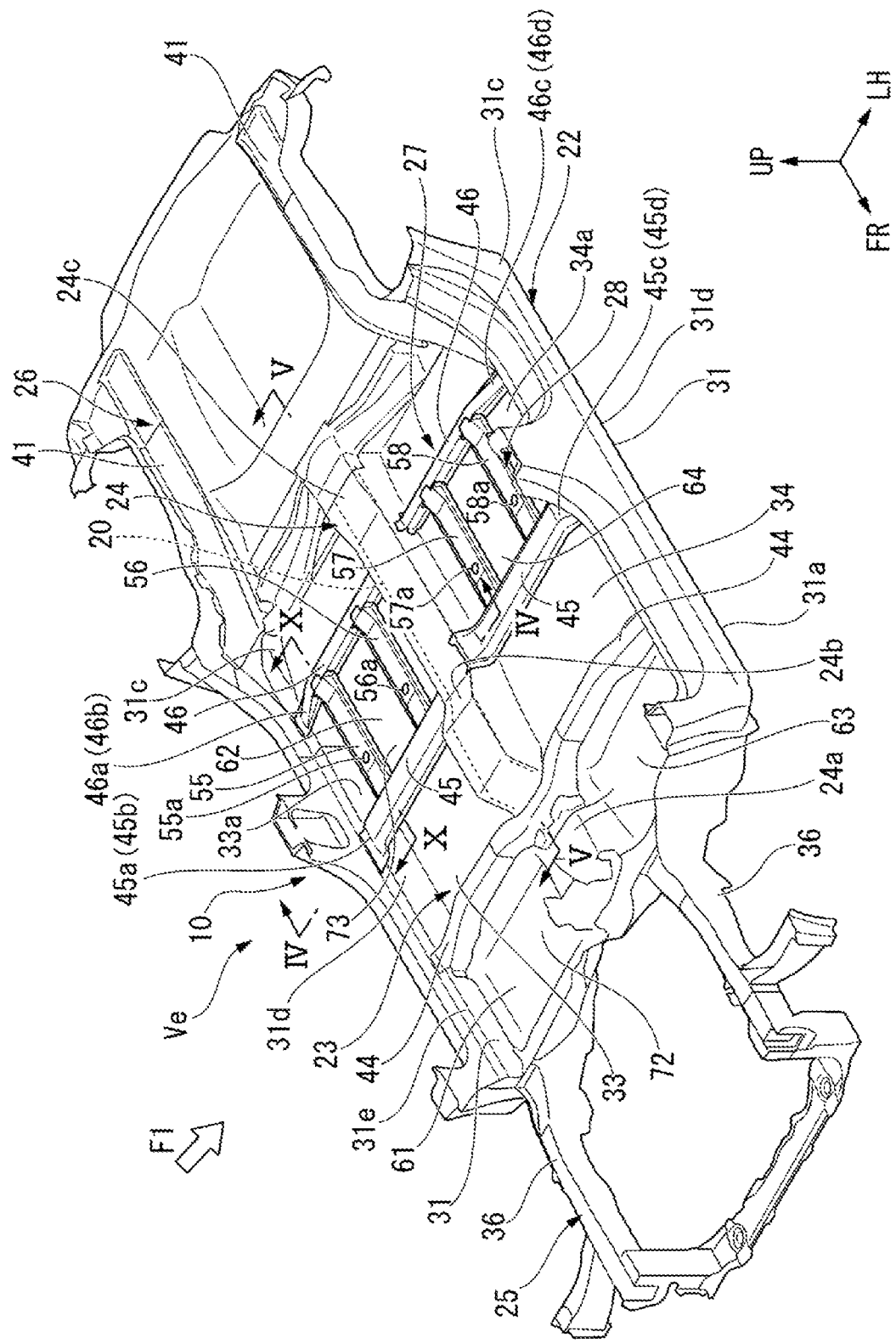
FIG. 2 is a perspective view of the vehicle equipped with a battery pack according to the embodiment as viewed obliquely from the front.
Figure 3:
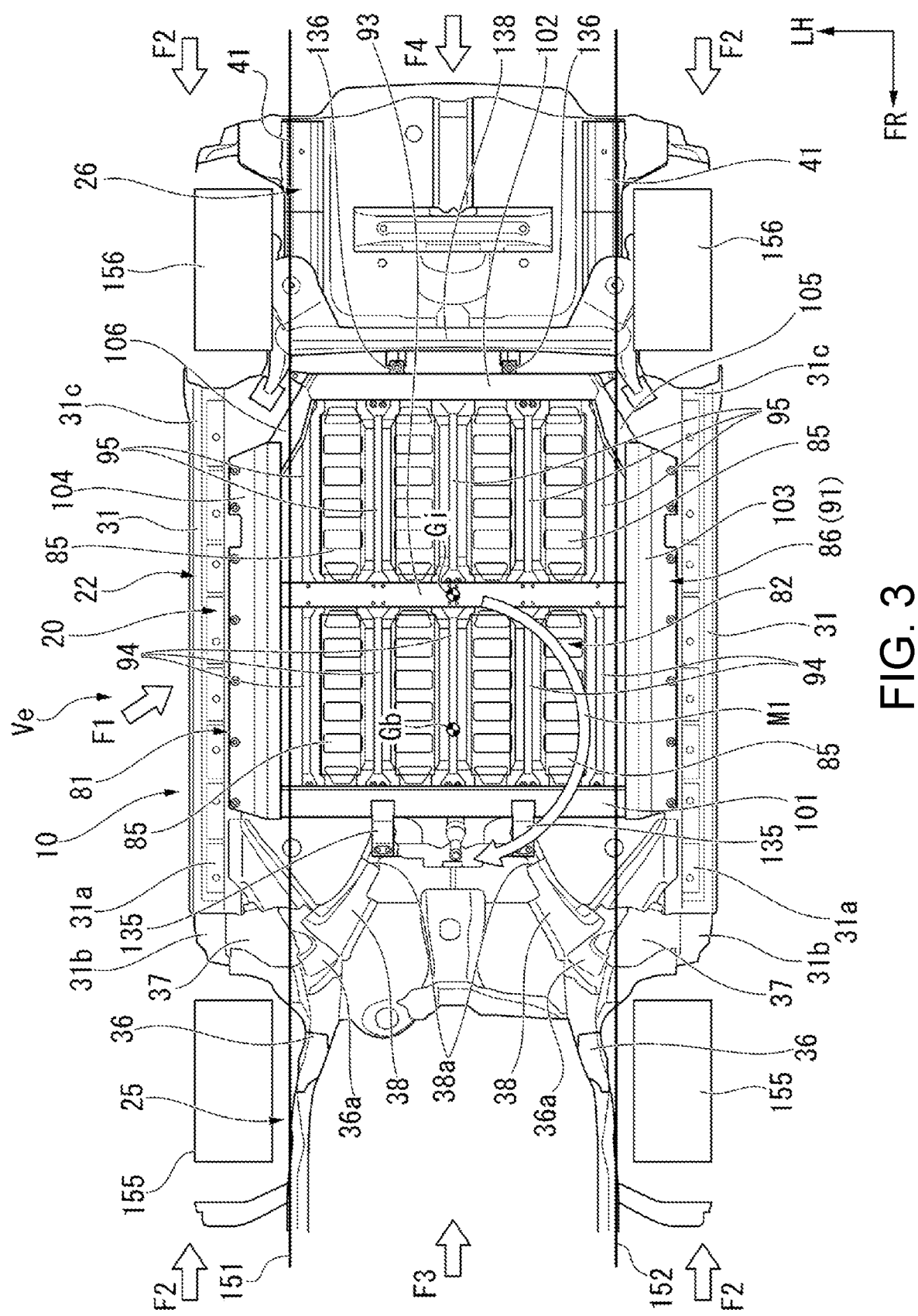
FIG. 3 is a bottom view showing the vehicle equipped with a battery pack according to the embodiment.

As shown in FIGS. 1 to 3, a vehicle Ve equipped with a battery pack includes a vehicle main body (hereinafter, also referred to as vehicle body 10) 10 and a battery pack 20. Hereinafter, the vehicle Ve equipped with a battery pack may be simply referred to as "vehicle Ve".

The vehicle main body 10 includes a side sill unit 22, a floor panel 23, a floor tunnel 24, a front side frame unit 25, a rear frame unit 26, a floor cross member unit 27, and a floor longitudinal frame unit 28.

The side sill unit 22 includes a right side sill (side sill) 31 and a left side sill (side sill) 31. The right side sill 31 is a highly rigid member that is formed in a closed cross section and constitutes a part of the framework of the vehicle body 10. The right side sill 31 is arranged on a right outer side in a vehicle width direction and extends in the front-rear direction of the vehicle body along the right outer side portion of the floor panel 23 in the vehicle width direction. The left side sill 31 is a highly rigid member that is formed in a closed cross section and constitutes a part of the framework of the vehicle body 10. The left side sill 31 is arranged at a left outer side in the vehicle width direction and extends in the front-rear direction of the vehicle body along the left outer side portion of the floor panel 23 in the vehicle width direction.

The floor panel 23 is arranged between the left side sill 31 and the right side sill 31. The floor panel 23 is a plate-shaped member having a substantially rectangular shape in a plan view and forms a floor portion of the vehicle body 10. The floor panel 23 includes a first floor portion 33 and a second floor portion 34.

The first floor portion 33 is arranged on the right side in the vehicle width direction (one side in the vehicle width direction) between the right side sill 31 and the floor tunnel 24.

The second floor portion 34 is arranged on the left side in the vehicle width direction (the other side in the vehicle width direction) between the left side sill 31 and the floor tunnel 24.

The floor tunnel 24 is extended in the front-rear direction of the vehicle body between the first floor portion 33 and the second floor portion 34. The floor tunnel 24 is raised upward from the floor panel 23.

The front side frame unit 25 includes a right front side frame (front side frame) 36 and a left front side frame (front side frame) 36. The right front side frame 36 and the left front side frame 36 are arranged in front of the battery pack 20 in the vehicle body.

The right front side frame 36 extends from a front portion 31a of the right side sill 31 toward the front of the vehicle body and is formed in a substantially V shape in a plan view. The right front side frame 36 is a highly rigid member that is formed in a closed cross section and constitutes a part of the framework of the vehicle body 10. The right front side frame 36 has a bent portion (a rear end portion of the right front side frame 36) 36a connected to a front end portion 31b of the right side sill 31 by a right outrigger 37. A right branch portion (branch portion) 38 is joined to the right bent portion 36a.

The right branch portion 38 is extended inward in an inclined manner in the vehicle width direction toward the rear of the vehicle body. A rear end portion 38a of the right branch portion 38 is coupled to a right front support bracket 135 (described later) of the battery pack 20.

The left front side frame 36 extends from the front portion 31a of the left side sill 31 toward the front of the vehicle body and is formed in a substantially V shape in a plan view. The left front side frame 36 is a highly rigid member that is formed in a closed cross section and constitutes a part of the framework of the vehicle body 10. The left front side frame 36 has a bent portion (the rear end portion of the left front side frame 36) 36a connected to the front end portion 31b of the left side sill 31 by a left outrigger 37. A left branch portion (branch portion) 38 is joined to a left bent portion 36a.

The left branch portion 38 is extended inward in an inclined manner in the vehicle width direction toward the rear of the vehicle body. A rear end portion 38a of the left branch portion 38 is coupled to a left front support bracket 135 (described later) of the battery pack 20.

The rear frame unit 26 has a right rear frame (rear frame) 41 and a left rear frame (rear frame) 41. The right rear frame 41 and the left rear frame 41 are arranged at the rear of the battery pack 20 in the vehicle body.

The right rear frame 41 extends from a rear end portion 31c of the right side sill 31 toward the rear of the vehicle body and is formed in a substantially J shape in a plan view. The right rear frame 41 is a highly rigid member that is formed in a closed cross section and constitutes a part of the framework of the vehicle body 10.

The left rear frame 41 extends from a rear end portion 31c of the left side sill 31 toward the rear of the vehicle body and is formed in a substantially J shape in a plan view. The left rear frame 41 is a highly rigid member that is formed in a closed cross section and constitutes a part of the framework of the vehicle body 10.

The floor cross member unit 27 is arranged between the right side sill 31 and the left side sill 31 and is joined along the upper surface of the floor panel 23.

The floor cross member unit 27 includes a right first floor cross member 44, a left first floor cross member 44, a right second floor cross member (floor cross member) 45, a left second floor cross member (floor cross member) 45, a right third floor cross member (floor cross member) 46, and a left third floor cross member (floor cross member) 46.

The right first floor cross member 44 is extended in the vehicle width direction on the first floor portion 33 between the vicinity of the front portion 31a of the right side sill 31 and a front portion 24a of the floor tunnel 24. The right first floor cross member 44 is raised from the upper surface of the first floor portion 33 and forms a closed cross section with the first floor portion 33.

The left first floor cross member 44 is extended in the vehicle width direction at the second floor portion 34 between the front portion 31a of the left side sill 31 and the front portion 24a of the floor tunnel 24. The left first floor cross member 44 is raised from the upper surface of the second floor portion 34 and forms a closed cross section with the second floor portion 34.

Figure 4:
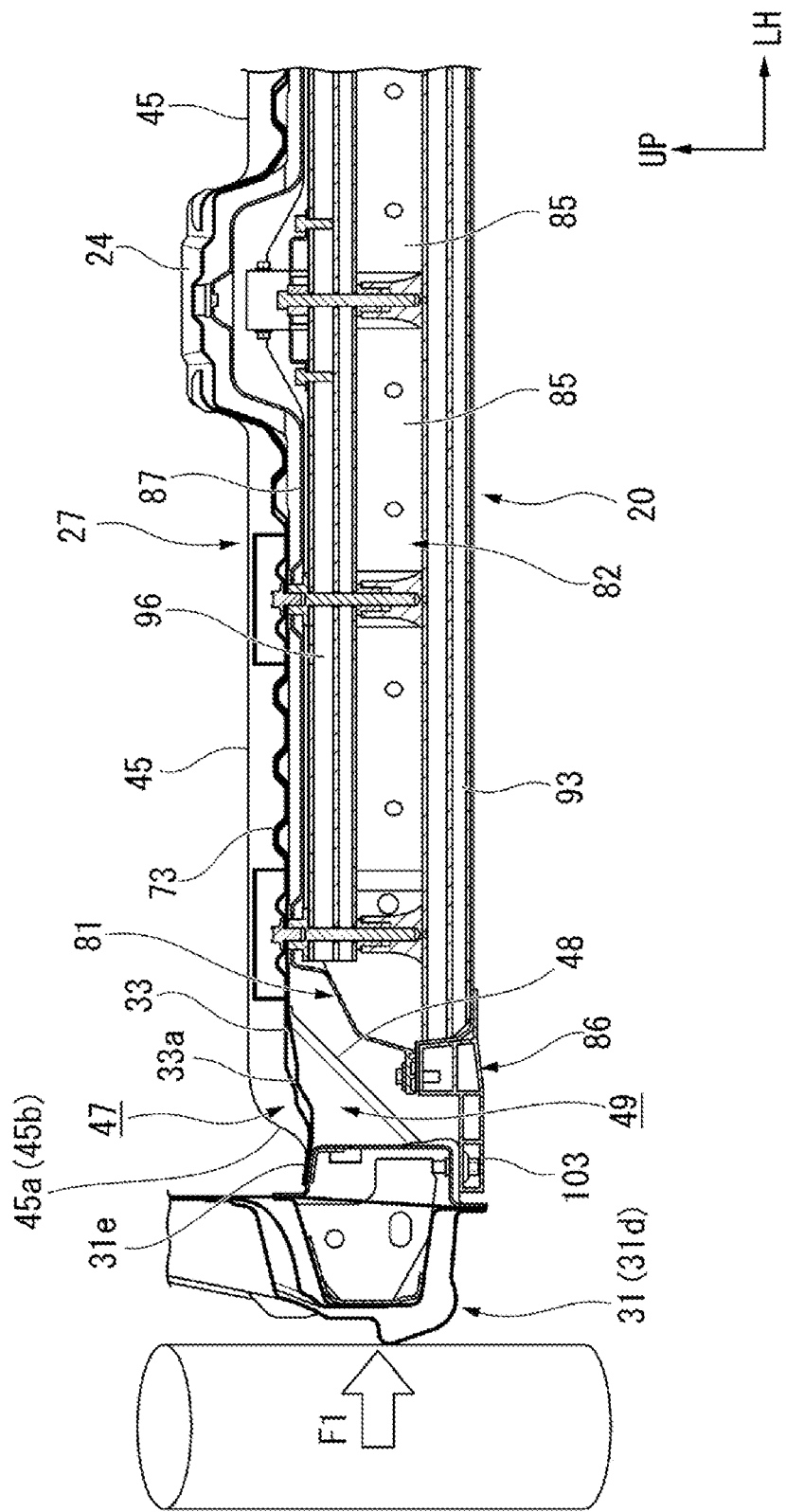
FIG. 4 is a cross-sectional view in which the vehicle equipped with a battery pack of FIG. 2 is fractured at line IV-IV.

As shown in FIGS. 2 and 4, the right second floor cross member 45 is extended in the vehicle width direction between a center 31d of the right side sill 31 and a center 24b of the floor tunnel 24. The right second floor cross member 45 is raised from the upper surface of the first floor portion 33 and forms a closed cross section with the first floor portion 33. A top portion 45b of a right end portion (end portion) 45a of the right second floor cross member 45 is inclined downward toward the right outer side in the vehicle width direction to the center 31d of the right side sill 31. Hereinafter, the right end portion 45a of the right second floor cross member 45 may also be referred to as "cross member right end portion 45a".

A cross-member inclined closed cross section (closed cross section) 47 is formed by the cross member right end portion 45a and a right end portion 33a of the first floor portion 33.

An inclined member 48 is arranged below the cross member right end portion 45a. The inclined member 48 is arranged below the first floor portion 33 (specifically, the right end portion 33a) in a manner of sandwiching the right end portion (the portion in the vicinity of the side sill 31) 33a of the first floor portion 33 together with the cross member right end portion 45a.

The inclined member 48 forms an inclined closed cross section (closed cross section) 49 to the center 31d of the right side sill 31 together with the right end portion 33a of the first floor portion 33. Thereby, the right end portion 33a of the first floor portion 33 is reinforced by the right second floor cross member 45 and the inclined member 48. Here, the inclined closed cross section 49 is formed larger than the cross-member inclined closed cross section 47.

Hereinafter, a left second floor cross member 45, a right third floor cross member 46, and a left third floor cross member 46 are described. Note that, in the following description, for the sake of convenience, the cross-member inclined closed cross section, the inclined member, and the inclined closed cross section are described with the same signs as the cross-member inclined closed cross section 47, the inclined member 48, and the inclined closed cross section 49 described for the right second floor cross member 45.

The left second floor cross member 45 is extended in the vehicle width direction between a center 31$d$ of the left side sill 31 and the center 24$b$ of the floor tunnel 24. The left second floor cross member 45 is raised from the upper surface of the second floor portion 34 and forms a closed cross section with the second floor portion 34. A top portion 45$d$ of a left end portion (end portion) 45$c$ of the left second floor cross member 45 is inclined downward toward the left outer side in the vehicle width direction to the center 31$d$ of the left side sill 31. Hereinafter, the left end portion 45$c$ of the left second floor cross member 45 may also be referred to as "cross member left end portion 45$c$".

The cross-member inclined closed cross section (closed cross section) 47 is formed by the cross member left end portion 45$c$ and a left end portion 34$a$ of the second floor portion 34.

The inclined member 48 (not shown) is arranged below the cross member left end portion 45$c$. The inclined member 48 is arranged below the second floor portion 34 (specifically, the left end portion 34$a$) in a manner of sandwiching the left end portion (the portion in the vicinity of the side sill 31) 34$a$ of the second floor portion 34 together with the cross member left end portion 45$c$.

The inclined member 48 forms the inclined closed cross section (closed cross section) 49 (not shown) to the center 31$d$ of the left side sill 31 together with the left end portion 34$a$ of the second floor portion 34. Thereby, the left end portion 34$a$ of the second floor portion 34 is reinforced by the left second floor cross member 45 and the inclined member 48. Here, the inclined closed cross section 49 is formed larger than the cross-member inclined closed cross section 47.

The right third floor cross member 46 is extended in the vehicle width direction on the first floor portion 33 between the vicinity of the rear end portion 31$c$ of the right side sill 31 and the vicinity of a rear end portion 24$c$ of the floor tunnel 24. The right third floor cross member 46 is raised from the upper surface of the first floor portion 33 and forms a closed cross section with the first floor portion 33. A top portion 46$b$ of a right end portion (end portion) 46$a$ of the right third floor cross member 46 is inclined downward toward the outer side in the vehicle width direction to the vicinity of the rear end portion 31$c$ of the right side sill 31. Hereinafter, the right end portion 46$a$ of the right third floor cross member 46 may also be referred to as "cross member right end portion 46$a$".

The cross-member inclined closed cross section (closed cross section) 47 is formed by the cross member right end portion 46$a$ and the right end portion 33$a$ of the first floor portion 33.

The inclined member 48 (not shown) is arranged below the cross member right end portion 46$a$. The inclined member 48 is arranged below the first floor portion 33 (specifically, the right end portion 33$a$) in a manner of sandwiching the right end portion (the portion in the vicinity of the side sill 31) 33$a$ of the first floor portion 33 together with the cross member right end portion 46$a$.

The inclined member 48 forms the inclined closed cross section (closed cross section) 49 (not shown) to the vicinity of the rear end portion 31$c$ of the right side sill 31 together with the right end portion 33$a$ of the first floor portion 33. Thereby, the right end portion 33$a$ of the first floor portion 33 can be reinforced by the right third floor cross member 46 and the inclined member 48. Here, the inclined closed cross section 49 is formed larger than the cross-member inclined closed cross section 47.

The left third floor cross member 46 is extended in the vehicle width direction at the second floor portion 34 between the vicinity of the rear end portion 31$c$ of the left side sill 31 and the vicinity of the rear end portion 24$c$ of the floor tunnel 24. The left third floor cross member 46 is raised from the upper surface of the second floor portion 34 and forms a closed cross section with the second floor portion 34. A top portion 46$d$ of a left end portion (end portion) 46$c$ of the left third floor cross member 46 is inclined downward toward the outer side in the vehicle width direction to the vicinity of the rear end portion 31$c$ of the left side sill 31. Hereinafter, the left end portion 46$c$ of the left third floor cross member 46 may also be referred to as "cross member left end portion 46$c$".

The cross-member inclined closed cross section (closed cross section) 47 is formed by the cross member left end portion 46$c$ and the left end portion 34$a$ of the second floor portion 34.

The inclined member 48 (not shown) is arranged below the cross member left end portion 46$c$. The inclined member 48 is arranged below the second floor portion 34 (specifically, the left end portion 34$a$) in a manner of sandwiching the left end portion (the portion in the vicinity of the side sill 31) 34$a$ of the second floor portion 34 together with the cross member left end portion 46$c$.

The inclined member 48 forms the inclined closed cross section (closed cross section) 49 (not shown) to the vicinity of the rear end portion 31$c$ of the left side sill 31 together with the left end portion 34$a$ of the second floor portion 34. Thereby, the left end portion 34$a$ of the second floor portion 34 can be reinforced by the left third floor cross member 46 and the inclined member 48. Here, the inclined closed cross section 49 is formed larger than the cross-member inclined closed cross section 47.

Moreover, in the description of the left and right second floor cross members 45 and the left and right third floor cross members 46, the reason for making the inclined closed cross section 49 larger than the cross-member inclined closed cross section 47 is described later in detail.

The floor longitudinal frame unit 28 has a plurality of first to fourth floor longitudinal frames (floor longitudinal frames) 55 to 58 spaced apart on the floor panel 23 in the vehicle width direction. Specifically, the floor longitudinal frame unit 28 includes the first floor longitudinal frame 55 and the second floor longitudinal frame 56 arranged on the first floor portion 33, and the third floor longitudinal frame 57 and the fourth floor longitudinal frame 58 arranged on the second floor portion 34.

The first floor longitudinal frame 55 and the second floor longitudinal frame 56 are arranged apart from each other on the first floor portion 33 in the vehicle width direction and form a closed cross section with the first floor portion 33. Each front end portion of the first floor longitudinal frame 55 and the second floor longitudinal frame 56 is joined (coupled) to the right second floor cross member 45, and each rear end portion is joined (coupled) to the right third floor cross member 46. Moreover, the number of the floor longitudinal frames arranged on the first floor portion 33 can be selected arbitrarily.

The third floor longitudinal frame 57 and the fourth floor longitudinal frame 58 are arranged apart from each other on the second floor portion 34 in the vehicle width direction and form a closed cross section with the second floor portion 34. Each front end portion of the third floor longitudinal frame 57 and the fourth floor longitudinal frame 58 is joined (coupled) to the left second floor cross member 45, and each rear end portion is joined (coupled) to the left third floor cross member 46. Moreover, the number of the floor longitudinal frames arranged on the second floor portion 34 can be selected arbitrarily.

As shown in FIGS. 1 and 2, the first floor portion 33 has a first front footrest (footrest) 61 and a first rear footrest (footrest) 62.

The first front footrest 61 is arranged at a portion in front of the battery pack 20 in the vehicle body. Feet 66a of an occupant 66 seated in a right front seat (a seat, not shown) are placed on the first front footrest 61. The first rear footrest 62 is arranged at a portion above the battery pack 20 and between the first floor longitudinal frame 55 and the second floor longitudinal frame 56. Feet 67a of an occupant 67 seated in a right rear seat (a seat, not shown) are placed on the first rear footrest 62.

In addition, the second floor portion 34 has a second front footrest (footrest) 63 and a second rear footrest (footrest) 64. The second front footrest 63 is arranged at a portion in front of the battery pack 20 in the vehicle body. Feet 68a of an occupant 68 seated in a left front seat (a seat, not shown) are placed on the second front footrest 63. The second rear footrest 64 is arranged at a portion above the battery pack 20 and between the third floor longitudinal frame 57 and the fourth floor longitudinal frame 58. Feet 69a of an occupant 69 seated in a left rear seat (a seat, not shown) are placed on the second rear footrest 64.

Note that, in the embodiment, an example has been described in which the first front footrest 61, the second front footrest 63, the first rear footrest 62 and the second rear footrest 64 are arranged on the floor panel 23, but the disclosure is not limited thereto.

As another example, for example, one of the first front footrest 61, the second front footrest 63, the first rear footrest 62 and the second rear footrest 64 may be arranged on the floor panel 23.

In addition, the floor panel 23 has a front floor portion 72 formed at a portion in the vehicle body front of the battery pack 20, and a main floor portion 73 formed at a portion above the battery pack 20. The front floor portion 72 has the first front footrest 61 and the second front footrest 63.

The main floor portion 73 has the first rear footrest 62 and the second rear footrest 64.

The main floor portion 73 is joined to each upper end 31e (the left upper end 31e is not shown) of the right side sill 31 and the left side sill 31. By joining the main floor portion 73 to each upper end 31e of the right side sill 31 and the left side sill 31, a boundary between the main floor portion 73 and the right side sill 31 can be formed flat without any step in the up-down direction. In addition, a boundary between the main floor portion 73 and the left side sill 31 can be formed flat without any step in the up-down direction. Thereby, for example, the occupants 66 to 69 can easily get on and off the vehicle Ve equipped with a battery pack.

As shown in FIGS. 1, 2, and 4, the main floor portion 73 is joined to each upper end 31e of the right side sill 31 and the left side sill 31 to facilitate the entry and exit of the occupants 66 to 69. Therefore, it is difficult to secure the rigidity and strength of the portion in the vicinity of the left side sill 31 and the right side sill 31 against a load input by a side collision (hereinafter referred to as side collision load) F1.

Thus, a portion of the main floor portion 73 in the vicinity of the right side sill 31 (right end portion) is reinforced by the right second floor cross member 45 and the inclined member 48, as well as the right third floor cross member 46 and the inclined member 48. Similarly, a portion of the main floor portion 73 in the vicinity of the left side sill 31 (left end portion) is reinforced by the left second floor cross member 45 and the inclined member 48, as well as the left third floor cross member 46 and the inclined member 48.

Thus, the rigidity and strength of the right end portion of the main floor portion 73 on the right side sill 31 side and the left end portion of the main floor portion 73 on the left side sill 31 side can be secured. This allows, for example, the side collision load F1 input by the side collision to be supported by the left and right second floor cross members 45, the left and right third floor cross members 46, the inclined member 48, and the like. Therefore, the main floor portion 73 can be formed along each upper end 31e of the right side sill 31 and the left side sill 31, and the occupants 66 to 69 can easily get on and off Moreover, even if the seat, to which the weight of the occupant is applied, is brought close to the vicinity of the right side sill 31 or the left side sill 31 and attached to the left and right second floor cross members 45 or the left and right third floor cross members 46, the seat can be supported on the inner surface of each side sill 31 by the inclined member 48.

Furthermore, the main floor portion 73 is provided with the first rear footrest 62 between the first floor longitudinal frame 55 and the second floor longitudinal frame 56, and the second rear footrest 64 between the third floor longitudinal frame 57 and the fourth floor longitudinal frame 58. This allows the first rear footrest 62 and the second rear footrest 64 to be lowered to a position close to the battery pack 20. In addition, the front floor portion 72 is provided with the first front footrest 61 and the second front footrest 63. The front floor portion 72 is arranged in front of the battery pack 20 in the vehicle body and below the main floor portion 73. Thereby, the first front footrest 61 and the second front footrest 63 are arranged below the first rear footrest 62 and the second rear footrest 64.

Thus, the first rear footrest 62 and the second rear footrest 64 are lowered to a position close to the battery pack 20. In addition, the first front footrest 61 and the second front footrest 63 are arranged below the first rear footrest 62 and the second rear footrest 64.

Accordingly, for example, an interior space 75 can be effectively utilized even in a compact car, and a large interior space 75 can be secured.

<Battery Pack>

Figure 5:
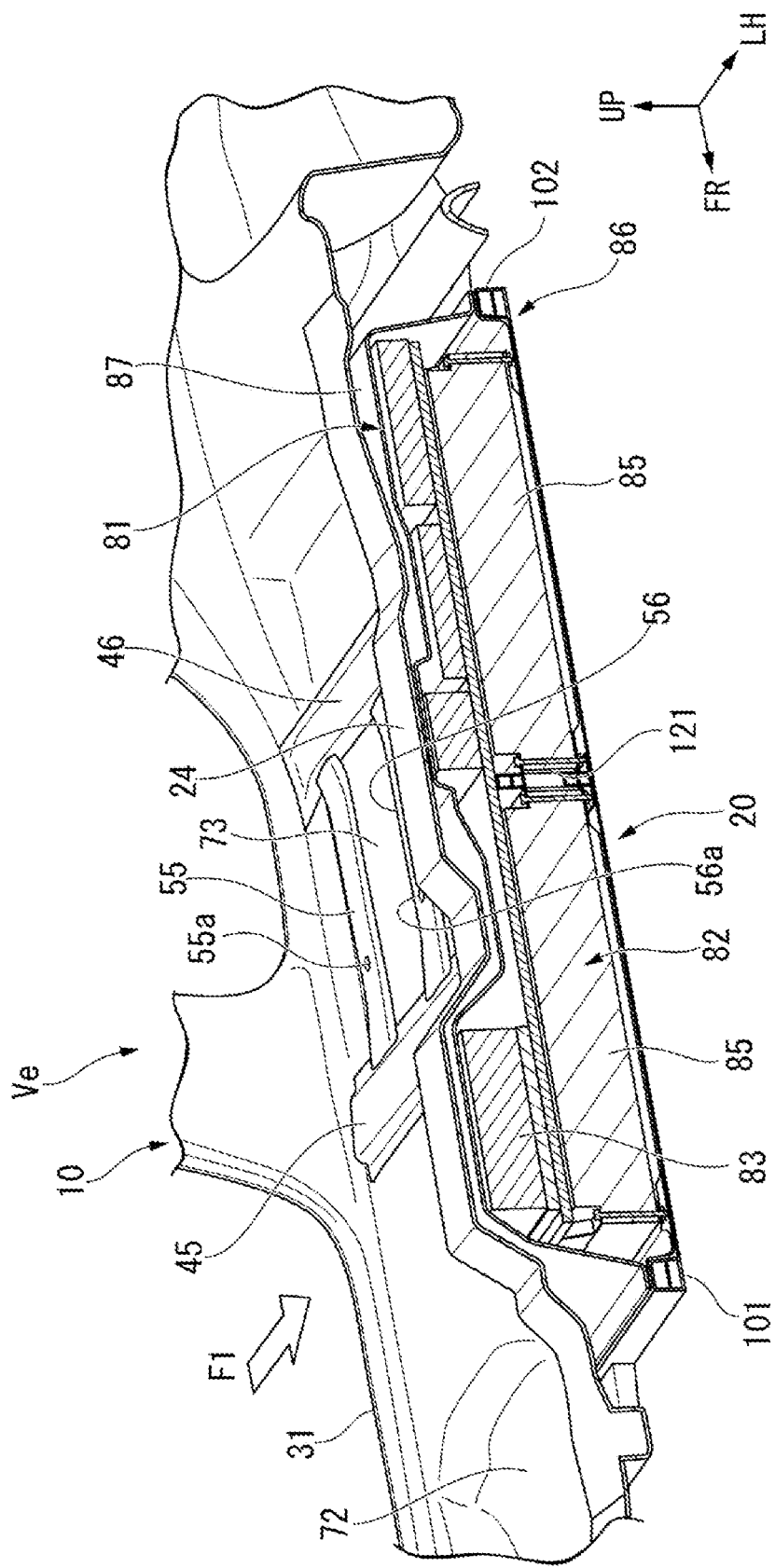
FIG. 5 is a cross-sectional view in which the vehicle equipped with a battery pack of FIG. 2 is fractured at line V-V.
Figure 6:
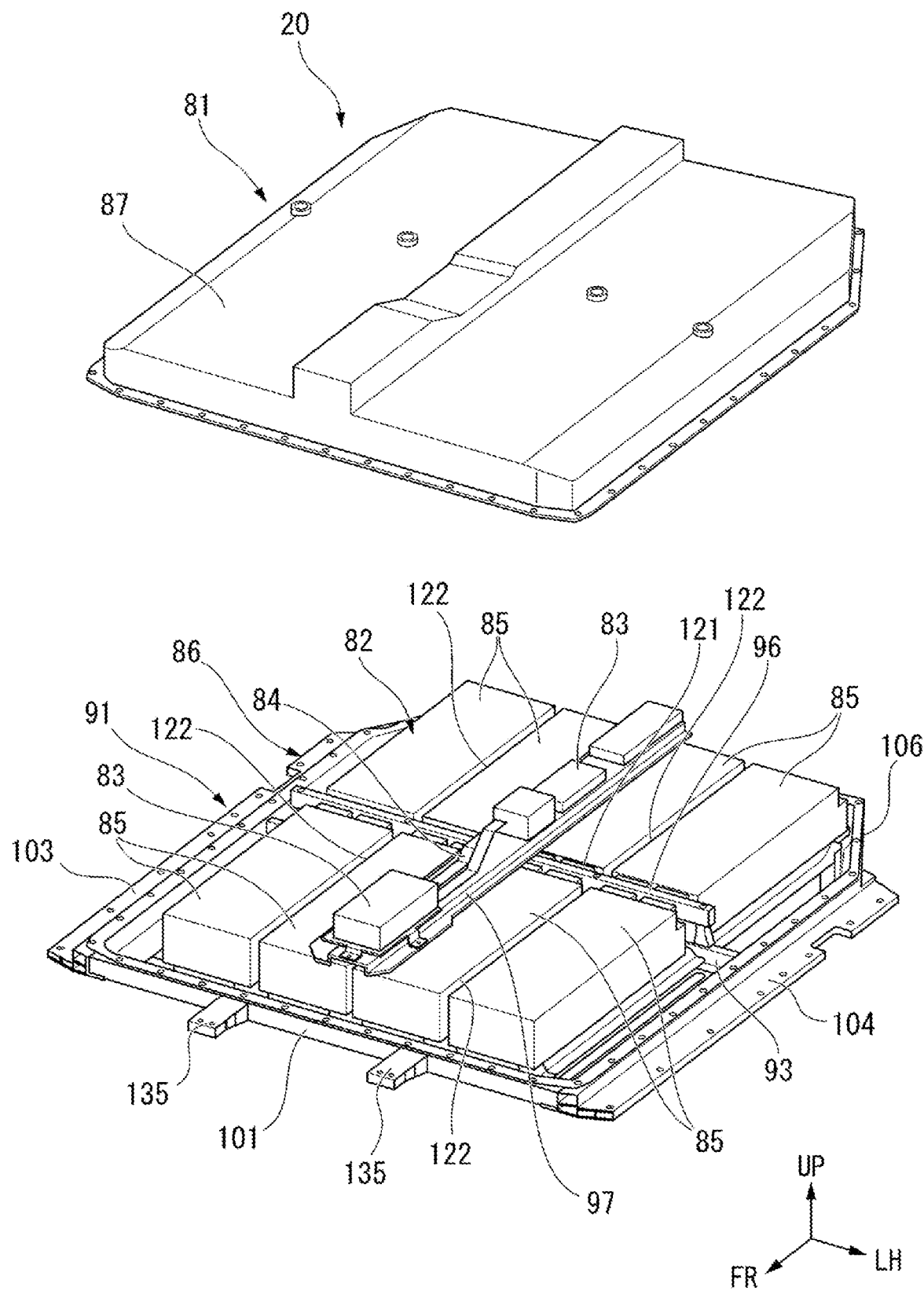
FIG. 6 is a perspective view showing a state in which a case cover is removed from the battery pack of the embodiment.
Figure 7:
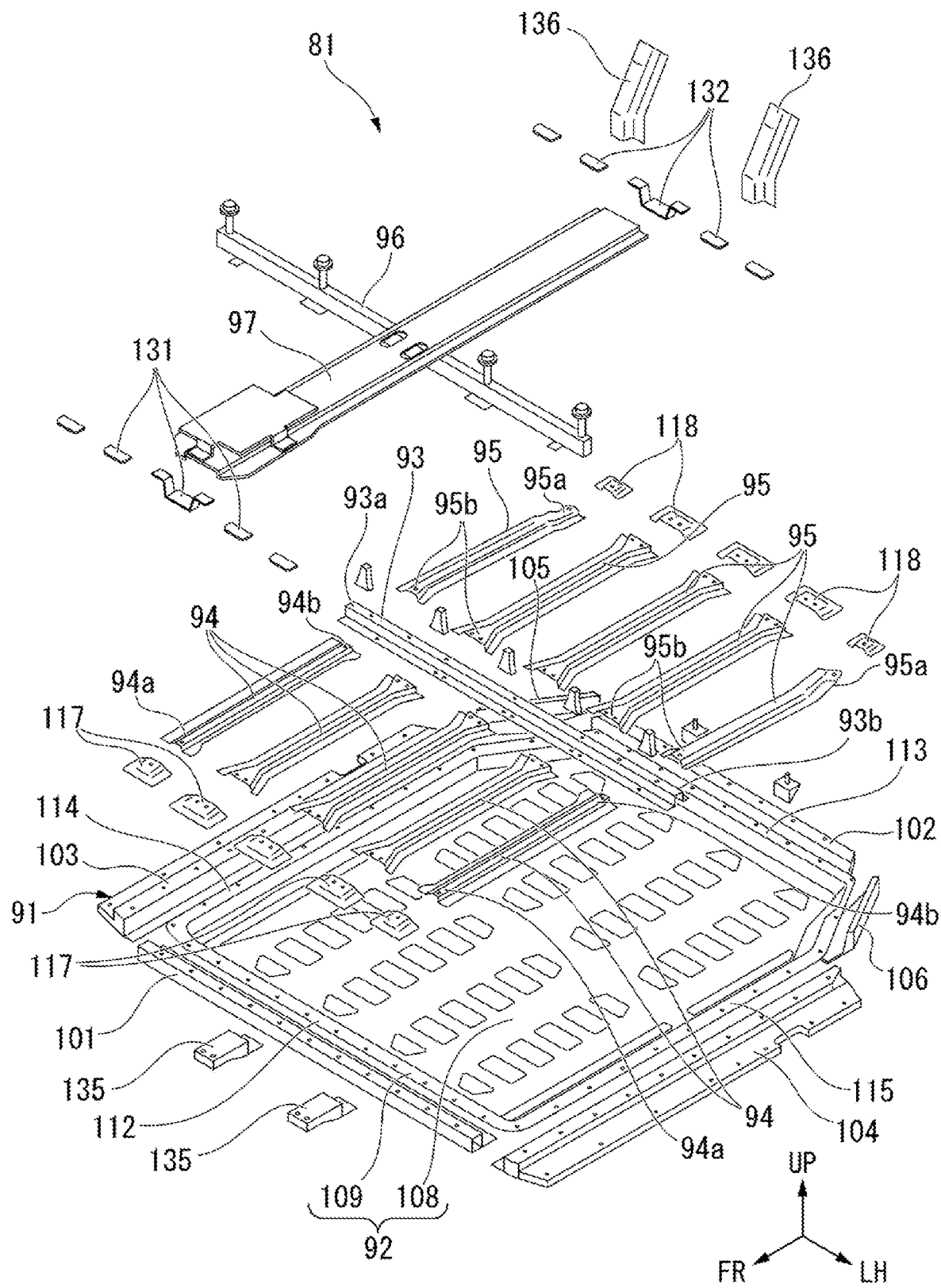
FIG. 7 is an exploded perspective view showing the battery pack of FIG. 6.

As shown in FIGS. 5 to 7, the battery pack 20 is arranged below the main floor portion 73 (that is, under the floor of the vehicle Ve). The battery pack 20 includes a battery case 81, a battery module 82, a battery accessory 83, and an electric wiring 84.

(Battery Case)

The battery case 81 includes a case body 86 and a case cover 87. The case body 86 includes a case frame portion (frame portion) 91, a case portion 92, a lower cross member (cross member) 93, a first longitudinal frame (front longitudinal frame, longitudinal frame) 94, a second longitudinal frame (rear longitudinal frame, longitudinal frame) 95, an upper cross member 96, and an upper deck 97.

The case frame portion 91 includes a front frame 101, a rear frame 102, a right frame 103, a left frame 104, a right inclined frame 105, and a left inclined frame 106.

The front frame 101 is arranged at a distance in the front of the vehicle body with respect to a front side edge of the battery module 82 and extends in the vehicle width direction.

The rear frame 102 is arranged at a distance at the rear of the vehicle body with respect to a rear side edge of the battery module 82 and extends in the vehicle width direction.

The right frame 103 is arranged at a distance on the right side in the vehicle width direction with respect to a right side edge of the battery module 82, and extends from a right end portion of the front frame 101 toward the rear of the vehicle body. The right frame 103 and the rear frame 102 are connected by the right inclined frame 105.

The left frame 104 is arranged at a distance on the left side in the vehicle width direction with respect to a left side edge of the battery module 82, and extends from a left end portion of the front frame 101 toward the rear of the vehicle body. The left frame 104 and the rear frame 102 are connected by the left inclined frame 106.

Figure 8:
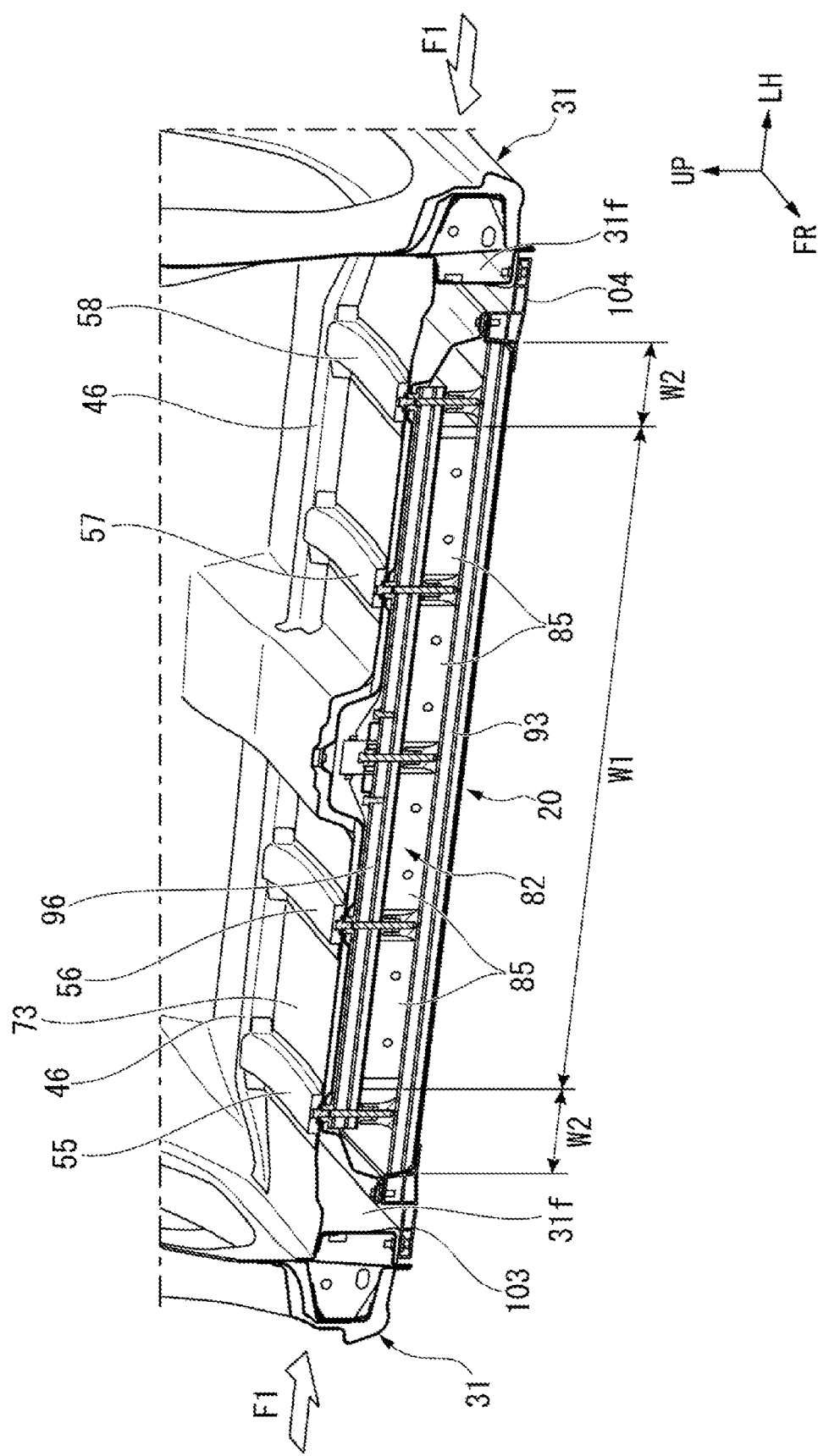
FIG. 8 is a perspective view in which the vehicle equipped with a battery pack of the embodiment is fractured at a first boundary portion of the battery pack.

As shown in FIGS. 3 and 8, the case frame portion 91 is formed in a substantially rectangular frame shape in a plan view by the front frame 101, the rear frame 102, the left frame 104, the right frame 103, the right inclined frame 105, and the left inclined frame 106. The case frame portion 91 is formed in a manner of covering an outer periphery of the battery module 82 at a distance.

The right frame 103 is attached to an inner panel 31f of the right side sill 31 from below.

The left frame 104 is attached to the inner panel 31f of the left side sill 31 from below.

Returning to FIGS. 5 to 7, the case frame portion 91 is attached to an outer periphery of the case portion 92. The case portion 92 is attached to the inside of the case frame portion 91 and is arranged below the battery module 82. Specifically, the case portion 92 has a case bottom (a bottom surface of the battery pack 20) 108 and a case peripheral wall 109. The case bottom 108 is arranged below the battery module 82 and is formed in a substantially rectangular shape in a plan view. The case bottom 108 forms the bottom of the battery case 81. The case peripheral wall 109 is formed along an outer periphery of the case bottom 108. The case peripheral wall 109 has a case front wall 112, a case rear wall 113, a case right wall 114, and a case left wall 115. The case portion 92 is provided with the lower cross member 93, a plurality of the first longitudinal frames 94, and a plurality of the second longitudinal frames 95.

The lower cross member 93 is arranged at the center of the case portion 92 in the front-rear direction of the vehicle body and is extended toward the vehicle width direction. For example, in the lower cross member 93, a right end portion 93a is in contact with the case right wall 114, and a left end portion 93b is in contact with the case left wall 115.

On the case bottom 108, a plurality of the first longitudinal frames 94 are arranged at intervals in the vehicle width direction in the vehicle body front of the lower cross member 93. On the case bottom 108, a plurality of the second longitudinal frames 95 are arranged at intervals in the vehicle width direction at the vehicle body rear of the lower cross member 93.

The plurality of first longitudinal frames 94 and the plurality of second longitudinal frames 95 are arranged in a manner of being spaced apart on the same line in the front-rear direction of the vehicle body. The lower cross member 93 is arranged between the plurality of first longitudinal frames 94 and the plurality of second longitudinal frames 95.

In the embodiment, one lower cross member 93 is illustrated, but the number of the lower cross member 93 can be selected as appropriate. In addition, in the embodiment, five first longitudinal frames 94 and five second longitudinal frames 95 are illustrated, but the number of the first longitudinal frame 94 and the number of the second longitudinal frame 95 can be selected as appropriate.

A front end portion 94a of the first longitudinal frame 94 is attached to the front frame 101 by a first mounting bracket 117 via the case bottom 108. In addition, a rear end portion 94b of the first longitudinal frame 94 is attached to the lower cross member 93.

A battery 85 is arranged vertically between a pair of adjacent first longitudinal frames 94, and the vertically arranged battery 85 is supported by the pair of first longitudinal frames 94.

A rear end portion 95a of the second longitudinal frame 95 is attached to the rear frame 102 by a second mounting bracket 118 via the case bottom 108. In addition, a front end portion 95b of the second longitudinal frame 95 is attached to the lower cross member 93.

The battery 85 is arranged vertically between a pair of adjacent second longitudinal frames 95, and the vertically arranged battery 85 is supported by the pair of second longitudinal frames 95.

The battery 85 is formed into a longitudinally elongated rectangular body by stacking a plurality of battery cells (not shown) in a longitudinal direction. Hereinafter, the longitudinally elongated battery 85 may also be referred to as "longitudinal battery 85".

In addition, a vertical arrangement of the longitudinal battery 85 refers to an arrangement of the battery 85 with a longitudinal direction of the battery 85 directed toward the front-rear direction of the vehicle body (longitudinal direction).

In this way, on the case bottom 108 of the case portion 92, a plurality of the first longitudinal frames 94 and a plurality of the second longitudinal frames 95 are arranged at internals in the front-rear direction of the vehicle body and are directed toward the front-rear direction of the vehicle body. Furthermore, the lower cross member 93 is arranged between the plurality of first longitudinal frames 94 and the plurality of second longitudinal frames 95.

Therefore, in case regions in the vehicle body front and at the vehicle body rear of the lower cross member 93, the plurality of longitudinal batteries 85 can be arranged vertically toward the front-rear direction of the vehicle body along the plurality of first longitudinal frames 94 and the plurality of second longitudinal frames 95. Accordingly, the plurality of longitudinal batteries 85 can be arranged vertically in an efficient manner, and a sufficient cruising range can thus be secured.

(Battery Module)

In the vehicle body front of the lower cross member 93, a plurality of front batteries 85 are supported vertically by the plurality of first longitudinal frames 94. At the vehicle body rear of the lower cross member 93, a plurality of rear batteries 85 are supported vertically by the plurality of second longitudinal frames 95. A front battery unit is constituted by the plurality of front batteries 85, and a rear battery unit is constituted by the plurality of rear batteries 85.

The front battery unit and the rear battery unit are arranged in pairs in the front-rear direction of the vehicle body. The front battery unit (that is, the plurality of front batteries 85) and the rear battery unit (that is, the plurality of rear batteries 85) constitute, for example, the battery module 82 for driving.

The battery module 82 is supported by the plurality of first longitudinal frames 94 and the plurality of second longitudinal frames 95 in a state that the plurality of batteries 85 are arranged vertically with the longitudinal direction directed toward the front-rear direction of the vehicle body.

In the embodiment, an example has been described in which the plurality of front batteries 85 and the plurality of rear batteries 85 are arranged in pairs in the front-rear direction of the vehicle body, but the disclosure is not limited thereto. As another example, the plurality of front batteries 85 and the plurality of rear batteries 85 may be arranged in three or more rows in the front-rear direction of the vehicle body.

The battery module 82 has, among the plurality of batteries 85, a first boundary portion 121 extending in the vehicle width direction and a second boundary portion 122 extending in the front-rear direction of the vehicle body (the second boundary portion 122 at the center in the vehicle width direction is not shown). The first boundary portion 121 extends in the vehicle width direction along the lower cross member 93.

The second boundary portion 122 extends in the front-rear direction of the vehicle body along the first longitudinal frames 94 and the second longitudinal frames 95.

The upper cross member 96 is arranged above the battery module 82 at a position corresponding to the first boundary portion 121.

Figure 9:
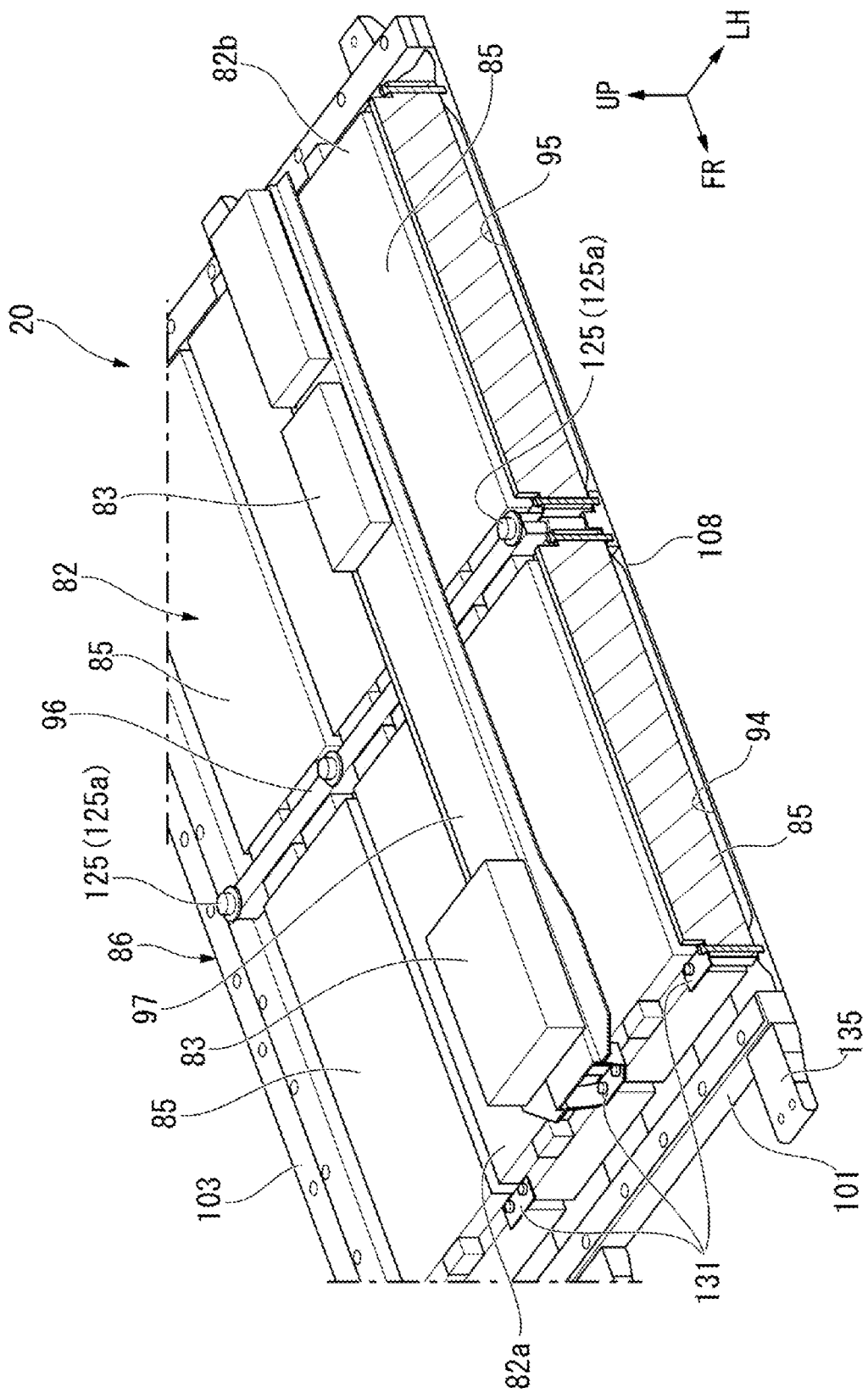
FIG. 9 is a perspective view in which the battery pack of the embodiment is fractured at a second boundary portion.
Figure 10:
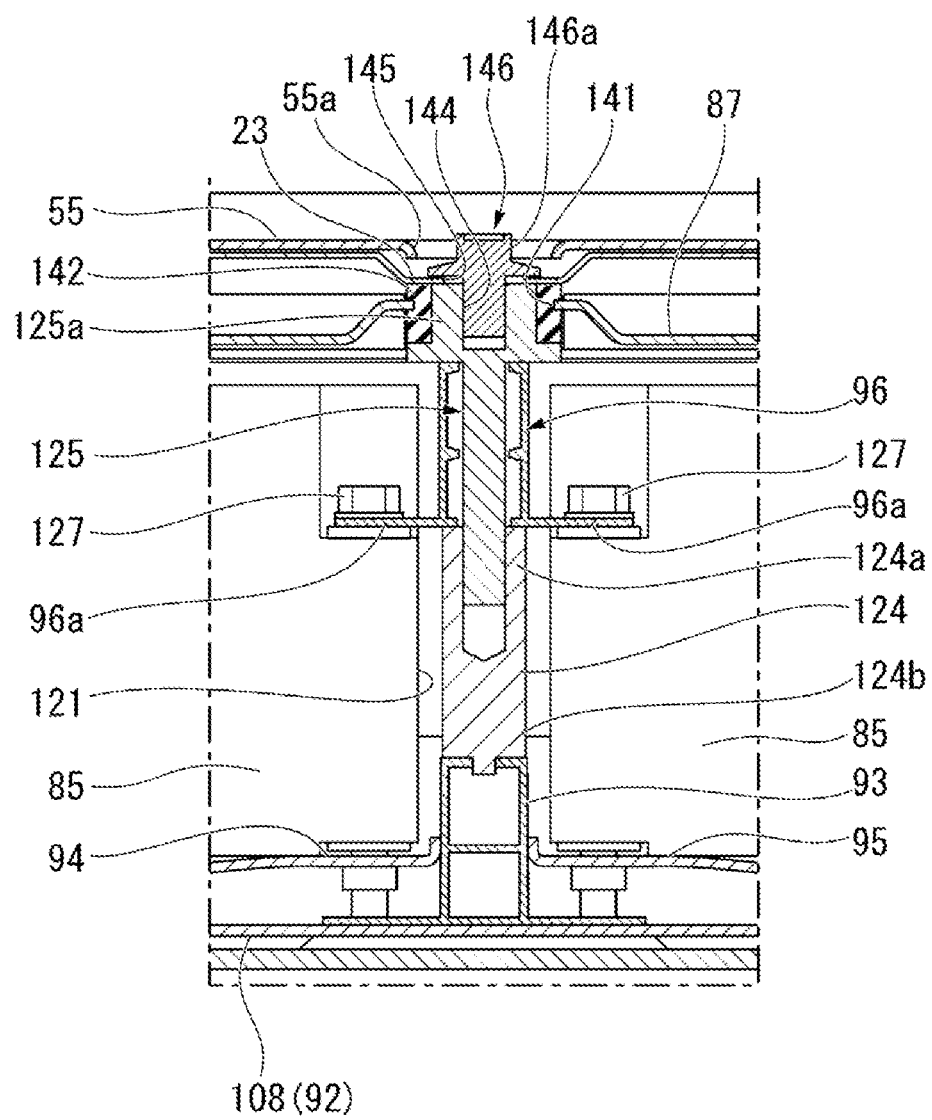
FIG. 10 is a cross-sectional view in which the vehicle equipped with a battery pack of FIG. 2 is fractured at line X-X.

As shown in FIGS. 8 to 10, the upper cross member 96 is arranged along the lower cross member 93. The upper cross member 96 is coupled to an upper end portion 124a of an upper and lower connecting collar 124 by a mounting bolt 125. A lower end portion 124b of the upper and lower connecting collar 124 is coupled to the lower cross member 93. Thereby, the upper cross member 96 is coupled to the lower cross member 93 via the mounting bolt 125 and the upper and lower connecting collar 124.

In this state, a flange 96a of the upper cross member 96 is coupled to the batteries 85 by a mounting bolt 127. Thereby, the plurality of batteries 85 are fixed from above by the upper cross member 96. Specifically, the upper cross member 96 connects the plurality of batteries 85 arranged in the front-rear direction of the vehicle body and also connects the plurality of batteries 85 arranged in the vehicle width direction at the center of the battery module 82 in the front-rear direction of the vehicle body.

In addition, the plurality of batteries 85 arranged in the vehicle width direction are connected at a front end portion 82a of the battery module 82 by a front connecting bracket 131 (see also FIG. 7). Furthermore, the plurality of batteries 85 arranged in the vehicle width direction are connected at a rear end portion 82b of the battery module 82 by a rear connecting bracket 132 (see FIG. 7).

In this way, the plurality of batteries 85 are placed on the plurality of first longitudinal frames 94 and the plurality of second longitudinal frames 95. Furthermore, the plurality of batteries 85 (that is, the battery module 82) are fixed from above by the upper cross member 96.

Specifically, in the front-rear direction of the vehicle body and the vehicle width direction, the plurality of batteries 85 are connected at the central portion of the battery module 82 in the front-rear direction of the vehicle body by the upper cross member 96 from above.

In addition, the front end portion 82a of the battery module 82 is connected by the front connecting bracket 131 in the vehicle width direction. Furthermore, the rear end portion 82b of the battery module 82 is connected by the rear connecting bracket 132 in the vehicle width direction.

Accordingly, the plurality of longitudinal batteries 85 (that is, the battery module 82) can be fixed stably and can be connected as a single unit while securing the rigidity of the battery module 82.

(Battery Accessory)

Above the plurality of batteries 85, the upper deck 97 is arranged at the second boundary portion 122 (not shown) at the center of the plurality of second boundary portions 122 in the vehicle width direction. The upper deck 97 is provided with the battery accessory 83 such as a high-voltage junction board, an electronic control unit (ECU, control device), or the like.

The high-voltage junction board is, for example, an accessory that supplies electricity of the battery module 82 for driving to a drive motor (not shown). The ECU is, for example, a battery management unit that controls discharge and charge between the battery module 82 for driving and the drive motor.

In this way, the battery accessory 83 is arranged above the battery module 82 at the center in the vehicle width direction and between the plurality of batteries 85 (that is, the second boundary portion 122 (not shown) at the center in the vehicle width direction). Thereby, a width dimension W1 of the battery module 82 in the vehicle width direction can be kept small without impairing the capacity of the battery module 82.

Accordingly, for example, a collision stroke space W2 that allows deformation caused by the side collision load F1 input by a side collision can be set between the right frame 103 and the batteries 85. Also, the collision stroke space W2 can be set between the left frame 104 and the batteries 85. Therefore, for example, an impact energy can be absorbed by setting a large collision stroke space W2 that allows the deformation caused by the side collision load F1 input by the side collision and deforming the right frame 103 or the left frame 104.

(Electrical Wiring)

As shown in FIG. 6, the electric wiring 84 is arranged in a space of the first boundary portion 121 of the battery module 82 and a space of the second boundary portion 122 at the center in the vehicle width direction.

In the embodiment, an example has been described in which the electric wiring 84 is arranged in the space of the first boundary portion 121 and the space of the second boundary portion 122, but the disclosure is not limited thereto. As another example, the electric wiring 84 may be arranged in one of the space of the first boundary portion 121 and the space of the second boundary portion 122.

Figure 11:
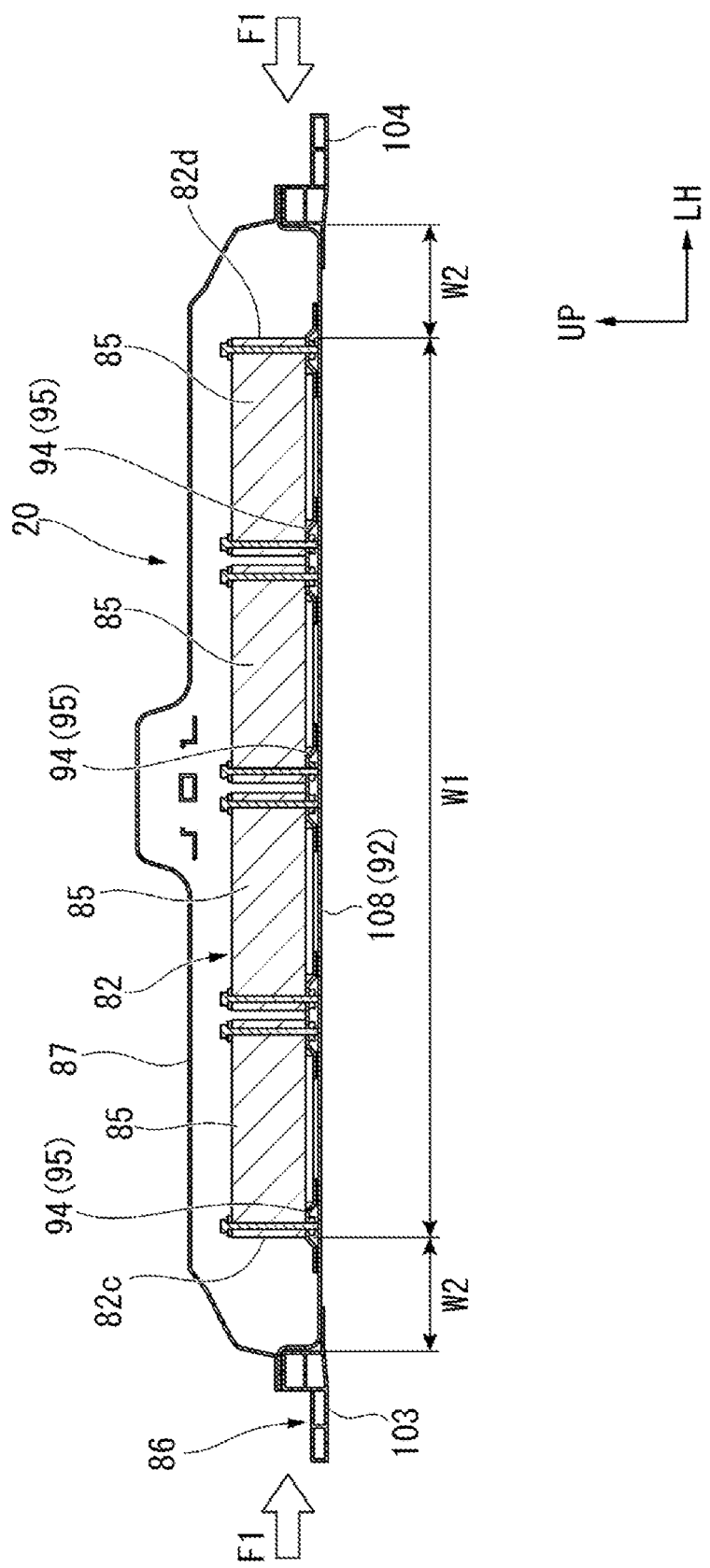
FIG. 11 is a cross-sectional view in which the battery pack of the embodiment is fractured at the first boundary portion.

As shown in FIGS. 5, 6 and 11, the case cover 87 is attached to the case frame portion 91 from above in a state that the battery module 82, the battery accessory 83, and the electric wiring 84 are accommodated in the case body 86. Accordingly, the battery pack 20 is assembled and attached to the floor of the vehicle Ve.

Here, for example, in the battery module 82 in which a plurality of the batteries 85 are arranged in the vehicle width direction and a pair of the batteries 85 is arranged in the front-rear direction of the vehicle body, terminals of the batteries 85 can be arranged toward the first boundary portion 121. Therefore, in the space of the first boundary portion 121, each terminal can be concentrated in the center of the battery pack 20 by passing a wire in the vehicle width direction while connecting each battery 85 toward the center of the vehicle width direction.

Furthermore, the left and right second floor cross members 45 are arranged in the vehicle body front direction of the first boundary portion 121, and the left and right third floor cross members 46 are arranged in the vehicle body rear direction of the first boundary portion 121. Thus, electrical components such as the terminals and the electric wiring 84 arranged in the first boundary portion 121 can be protected from, for example, the side collision load F1 input by a side collision.

Accordingly, because it is not required to arrange the electric wiring 84 or terminals on the outer side of the battery module 82 in the vehicle width direction, for example, the collision stroke space W2 that allows deformation caused by the side collision load F1 input by the side collision can be set large.

Here, for example, the battery pack 20 is provided with the upper cross member 96 above the first boundary portion 121. Therefore, each terminal concentrated in the center of the battery pack 20 is pulled out above the upper cross member 96 and is connected to a high-voltage component part such as the battery accessory 83 arranged in the front-rear direction of the vehicle body, and the wire is passed to the front of the vehicle body to arrange the electrical wiring (high voltage wiring) 84, and thereby the wire can be shortened. By shortening the wire, cost reduction and weight reduction can be achieved. In addition, because the wire is passed through a highly rigid portion of the battery pack 20 provided with the upper cross member 96, damage to the wiring can be suppressed when the vehicle body (specifically, the battery pack) vibrates.

(Assembly of Battery Pack 20 Under Floor of Vehicle)
As shown in FIGS. 3 and 8, the right frame 103 of the case body 86 is attached to the right side sill 31 from below. The left frame 104 of the case body 86 is attached to the left side sill 31 from below. The front frame 101 of the case body 86 is connected to a pair of branch portions 38 via a pair of front support brackets 135 (see also FIG. 7). The rear frame 102 of the case body 86 is connected to a frame rear cross member 138 via a pair of rear support brackets 136 (see also FIG. 7).

As shown in FIGS. 2 and 10, a head 125a of the mounting bolt 125 penetrates a through hole 141 of the case cover 87 and is in contact with the floor panel 23 on the upper side. In addition, a rubber member 142 arranged on the head 125a also penetrates the through hole 141 of the case cover 87 and is in contact with the floor panel 23 on the upper side.

A female screw 144 of the head 125a is arranged downward to fit to a mounting hole 145 of the floor panel 23. A mounting bolt 146 is screwed to the female screw 144 of the head 125a through the mounting hole 145 of the floor panel 23. A head 146a of the mounting bolt 146 protrudes upward from through holes 55a to 58a on the top of the first to fourth floor longitudinal frames 55 to 58.

Here, the left and right flanges of the first to fourth floor longitudinal frames 55 to 58 are joined to the floor panel 23. Therefore, the battery pack 20 is fixed to the first to fourth floor longitudinal frames 55 to 58 via the floor panel 23. Accordingly, the battery pack 20 is assembled under the floor of the vehicle Ve. In this state, the plurality of batteries 85 of the battery module 82 accommodated in the battery pack 20 are arranged vertically with the longitudinal direction directed toward the front-rear direction of the vehicle body (see also FIG. 6).

As described above, according to the vehicle Ve equipped with a battery pack according to the embodiment, the width W1 of the battery module 82 constituted of the plurality of batteries 85 in the vehicle width direction can be kept small as shown in FIG. 8. Therefore, for example, when the side collision load F1 is input to the side of the vehicle due to a side collision, the impact energy can be absorbed by setting a large collision stroke space (sometimes referred to as deformation allowable space) W2 generated by the side collision load F1 and deforming the right frame 103 or the left frame 104.

Furthermore, as shown in FIGS. 3 and 6, the battery pack 20 has a center of gravity of pack Gi located approximately at the center in the vehicle width direction and approximately at the center in the front-rear direction of the vehicle body in a plan view.

Here, in the battery pack 20, the battery module 82 constituted of a plurality of batteries 85 is elongated in the front-rear direction of the vehicle body. Therefore, the center of gravity of pack Gi of the battery pack 20 is arranged at the rear of a center of gravity of vehicle Gb of the entire vehicle in the vehicle body. The center of gravity of vehicle Gb of the entire vehicle is a center of gravity of the vehicle that includes all parts of the vehicle, such as the vehicle body 10, the motor (not shown), the battery pack 20, and the like.

By arranging the center of gravity of pack Gi of the battery pack 20 at the rear of the center of gravity of vehicle Gb in the vehicle body, a rotational moment M1 applied on the battery module 82 can be set small, the rotational moment M1 being generated by the side collision load F1 input to the side of the vehicle and centered on the center of gravity of vehicle Gb.

In this way, by setting the collision stroke space W2 to be large and the rotational moment M1 generated by the side collision load F1 to be small, for example, the reinforcement of the vehicle body 10 can be reduced, and thus the deformation of the battery pack 20 can be suppressed without increasing the weight of the vehicle body 10.

Additionally, as shown in FIG. 2, the battery pack 20 is fixed to the first to fourth floor longitudinal frames 55 to 58 via the floor panel 23. The first to fourth floor longitudinal frames 55 to 58 are extended toward the front-rear direction of the vehicle body at positions in front of and at the rear of the center of gravity of pack Gi in the vehicle body and aligned in the vehicle width direction with respect to the center of gravity of pack Gi.

Therefore, the positions aligned in the vehicle width direction with respect to the center of gravity of pack Gi of the battery pack 20 can be supported by the first to fourth floor longitudinal frames 55 to 58. Accordingly, the rigidity and strength of the floor panel 23 against the side collision load F1 that is input to the side of the vehicle due to the side collision can be secured.

As shown in FIGS. 3 and 11, a right outer end portion (outer end portion) 82c of the battery module 82 in the vehicle width direction is arranged (aligned with the axial center) on an extension line 151 of the right front side frame 36 and the right rear frame 41. In addition, a left outer end portion (outer end portion) 82d of the battery module 82 in the vehicle width direction is arranged (aligned with the axial center) on an extension line 152 of the left front side frame 36 and the left rear frame 41.

Thus, for example, when front wheels 155 and rear wheels 156 move toward the battery pack 20 under a small collision load F2 input by a small overlap collision, the battery module 82 can be protected by the left and right front side frames 36 and the left and right rear frames 41.

Accordingly, the vehicle body 10 deformed due to the movement of the front wheels 155 or the rear wheels 156 and the battery case 81 (an outer frame of the battery pack 20) of the battery pack 20 can be suppressed from interfering with the battery module 82 (that is, the plurality of batteries 85).

In the embodiment, an example has been described in which the right outer end portion 82c and the left outer end portion 82d of the battery module 82 are arranged on the extension lines 151, 152 of the front side frames 36 on both sides and the rear frames 41 on both sides, but the disclosure is not limited thereto. As another example, for example, the right outer end portion 82c and the left outer end portion 82d of the battery module 82 may be arranged on an extension line of one of the front side frames 36 on both sides and the rear frames 41 on both sides.

As shown in FIGS. 3 and 7, the right front support bracket 135 is coupled, via the front frame 101, to a first longitudinal frame 94 of the plurality of first longitudinal frames 94 that is located in the second position from the right outer side toward the inner side in the vehicle width direction (hereinafter referred to as second right side first longitudinal frame). The right front support bracket 135 is coupled to the rear end portion 38a of the right branch portion 38.

Thereby, the front end portion 94a of the second right side first longitudinal frame 94 is coupled to the rear end portion 38a of the right branch portion 38 via the front frame 101 and the right front support bracket 135.

Here, in the front-rear direction of the vehicle body, the second right side first longitudinal frame 94 is arranged on the same line as a second longitudinal frame 95 of the plurality of second longitudinal frames 95 that is located in the second position from the right outer side toward the inner side in the vehicle width direction (hereinafter referred to as second right side second longitudinal frame).

In addition, the left front support bracket 135 is coupled, via the front frame 101, to a first longitudinal frame 94 of the plurality of first longitudinal frames 94 that is located in the second position from the left outer side toward the inner side in the vehicle width direction (hereinafter referred to as second left side first longitudinal frame). The left front support bracket 135 is coupled to the rear end portion 38a of the left branch portion 38.

Thereby, the front end portion 94a of the second left side first longitudinal frame 94 is coupled to the rear end portion 38a of the left branch portion 38 via the front frame 101 and the left front support bracket 135.

Here, in the front-rear direction of the vehicle body, the second left side first longitudinal frame 94 is arranged on the same line as a second longitudinal frame 95 of the plurality of second longitudinal frames 95 that is located in the second position from the left outer side toward the inner side in the vehicle width direction (hereinafter referred to as second left side second longitudinal frame).

Therefore, a load input to the right front side frame 36 due to a frontal collision (hereinafter referred to as frontal collision load) F3 can be supported by the second right side first longitudinal frame 94 and the second right side second longitudinal frame 95 through the right branch portion 38. Also, the frontal collision load F3 input to the left front side frame 36 due to the frontal collision can be supported by the second left side first longitudinal frame 94 and the second left side second longitudinal frame 95 through the left branch portion 38.

Accordingly, for example, the weight of the vehicle body frame (framework member) such as the right side sill 31, the left side sill 31, or the like arranged on the outer side of the vehicle body 10 in the vehicle width direction can be reduced.

The rear end portion 95a of a second longitudinal frame 95 of the plurality of second longitudinal frames 95 that is located on the right outer side in the vehicle width direction (hereinafter referred to as first right side second longitudinal frame) is arranged (aligned) on the extension line 151 of the right rear frame 41.

Here, in the front-rear direction of the vehicle body, the first right side second longitudinal frame 95 is arranged on the same line as a first longitudinal frame 94 of the plurality of first longitudinal frames 94 that is located in the first position from the right outer side toward the inner side in the vehicle width direction (hereinafter referred to as first right side first longitudinal frame).

In addition, the rear end portion 95a of a second longitudinal frame 95 of the plurality of second longitudinal frames 95 that is located on the left outer side in the vehicle width direction (hereinafter referred to as first left side second longitudinal frame) is arranged (aligned) on the extension line 152 of the left rear frame 41.

Here, in the front-rear direction of the vehicle body, the first left side second longitudinal frame 95 is arranged on the same line as a first longitudinal frame 94 of the plurality of first longitudinal frames 94 that is located in the first position from the left outer side toward the inner side in the vehicle width direction (hereinafter referred to as first left side first longitudinal frame).

Therefore, a load input to the right rear frame 41 due to a rear collision (hereinafter referred to as rear collision load) F4 can be supported by the first right side second longitudinal frame 95 through the right rear frame 41. In addition, the rear collision load F4 input to the left rear frame 41 due to a rear collision can be supported by the first left side second longitudinal frame 95 through the left rear frame 41. Accordingly, for example, the weight of the vehicle body frame (framework member) such as the right side sill 31, the left side sill 31, or the like arranged on the outer side of the vehicle body 10 in the vehicle width direction can be reduced.

Figure 12:
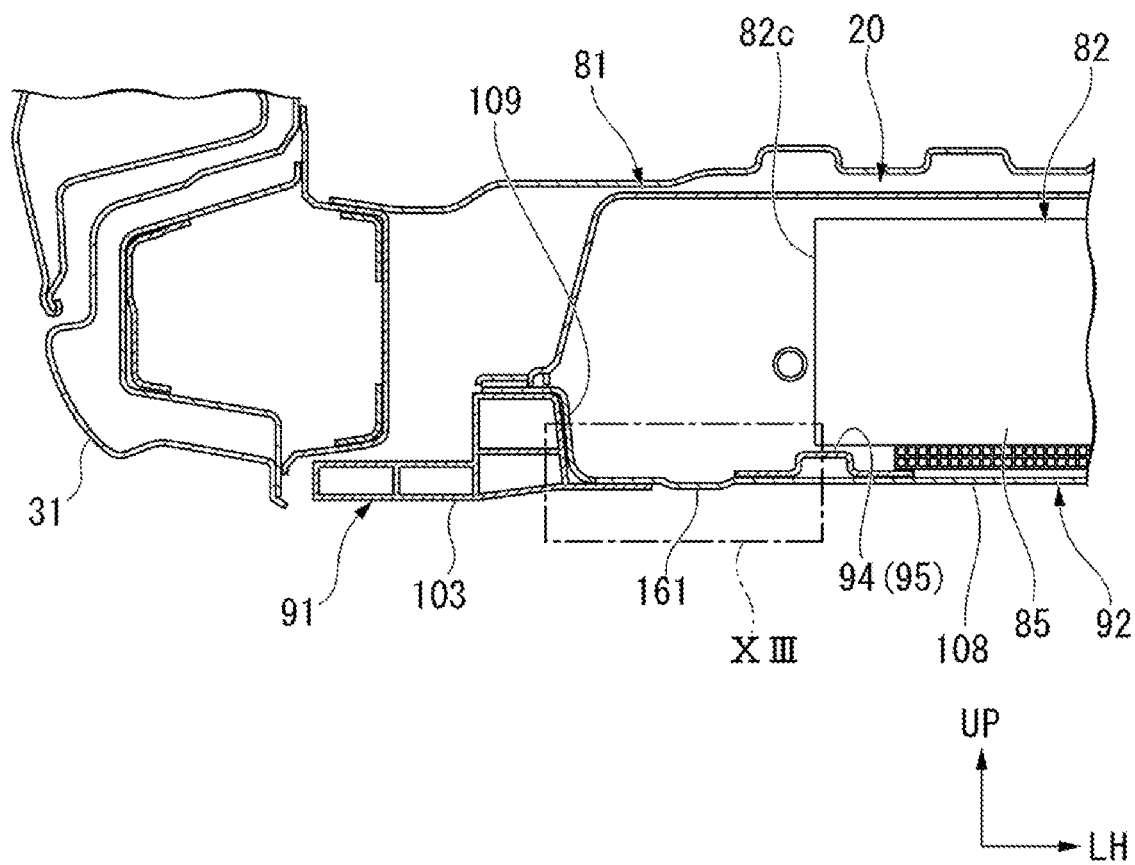
FIG. 12 is a cross-sectional view showing an easily deformable portion of the battery pack of the embodiment.
Figure 13:
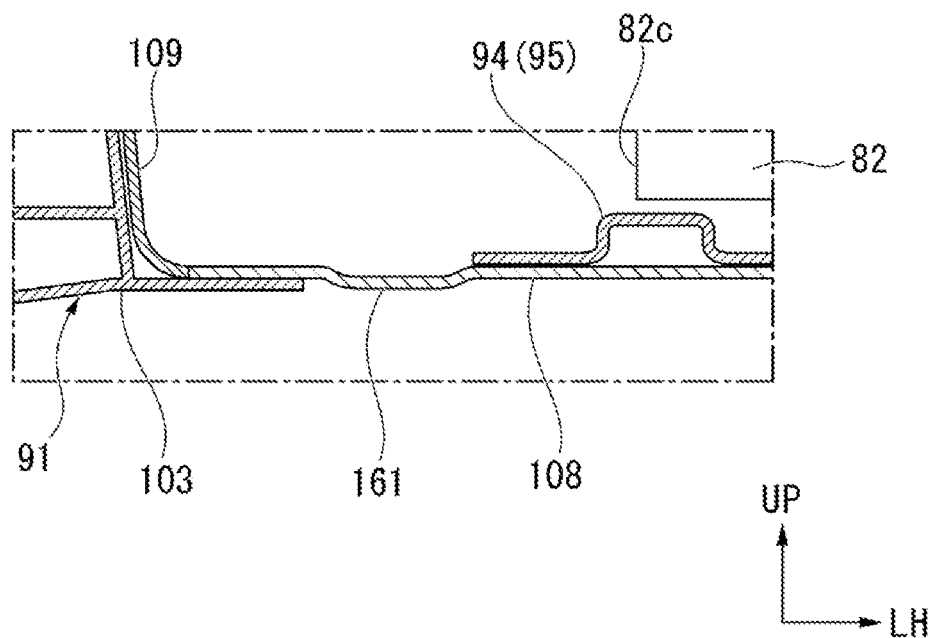
FIG. 13 is an enlarged cross-sectional view of a XIII portion of FIG. 12.

As shown in FIGS. 3, 12 and 13, the first right side first longitudinal frame 94 and the first right side second longitudinal frame 95 are extended toward the front-rear direction of the vehicle body at a right outer end portion 82c of the battery module 82 in the vehicle width direction. The first right side first longitudinal frame 94 and the first right side second longitudinal frame 95 support the right outer end portion 82c of the battery module 82 in the vehicle width direction.

On the case bottom 108 of the battery case 81, an easily deformable portion 161 is arranged further outward in the vehicle width direction than the first right side first longitudinal frame (outer longitudinal frame) 94 and the first right side second longitudinal frame (outer longitudinal frame) 95.

The easily deformable portion 161 is formed in a bead shape in a manner of protruding downward and extends in the front-rear direction of the vehicle body. The easily deformable portion 161 is formed to be deformable under the side collision load F1 of the side collision (see FIG. 14).

Figure 14:
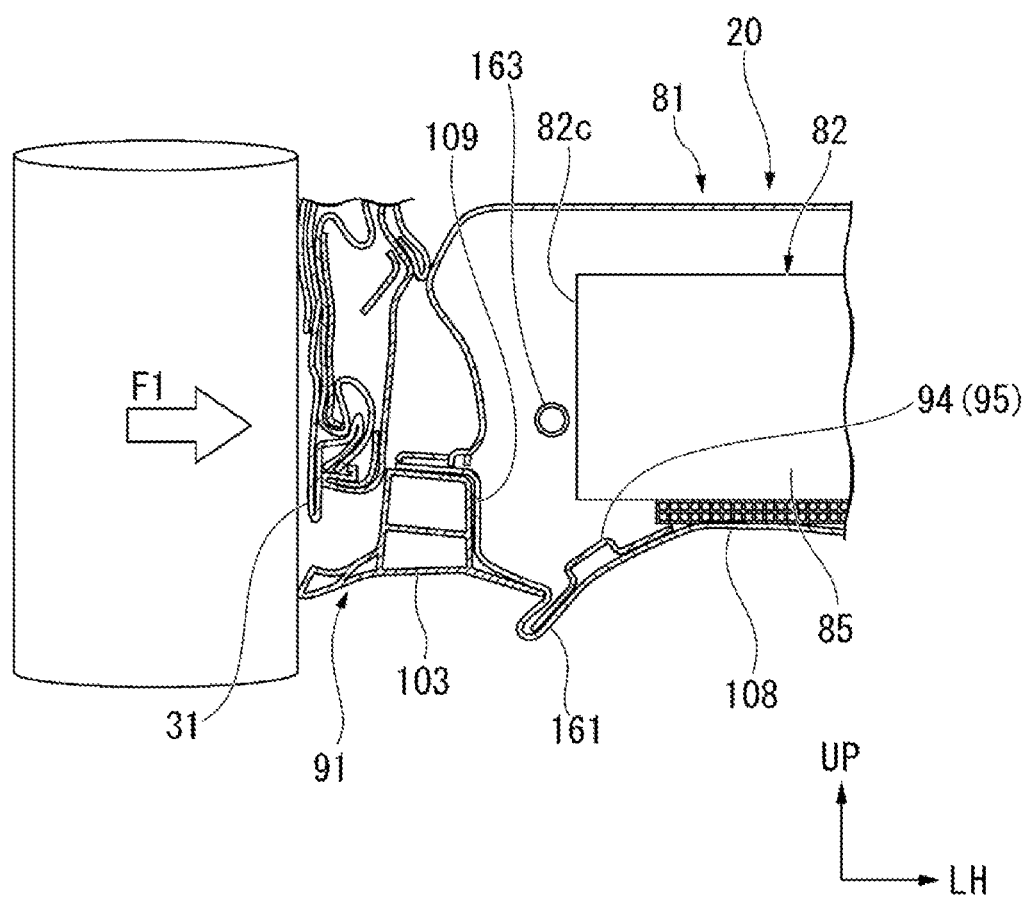
FIG. 14 is a cross-sectional view illustrating an example of deforming the easily deformable portion of the battery pack of the embodiment.

Therefore, as shown in FIG. 14, the side collision energy can be absorbed by the easily deformable portion 161 by deforming the easily deformable portion 161 under the side collision load F1 input by the side collision. Accordingly, for example, the need for the reinforcement of the vehicle body frame (framework member) such as the right side sill 31 or the like arranged on the outer side of the vehicle body in the vehicle width direction can be eliminated, and the weight of the vehicle body frame can thus be reduced.

Here, as shown in FIGS. 13 and 14, the easily deformable portion 161 is formed in a bead shape in a manner of protruding downward. Therefore, the easily deformable portion 161 can be deformed downward. Accordingly, for example, interference of the easily deformable portion 161 with the battery module 82 (that is, the plurality of batteries 85) accommodated in the battery case 81 of the battery pack 20, a water cooling pipe 163, or the like can be avoided.

In addition, on the left side of the case bottom 108 of the battery case 81, as on the right side, an easily deformable portion (not shown) is arranged further outward in the vehicle width direction than the first left side first longitudinal frame (outer longitudinal frame) 94 and the first left side second longitudinal frame (outer longitudinal frame) 95.

Therefore, the easily deformable portion can be deformed downward by the side collision load input by the side collision. Accordingly, the side collision energy can be absorbed by the easily deformable portion, which can eliminate the need for the reinforcement of the vehicle body frame (framework member) such as the left side sill 31 or the like, and reduce the weight of the vehicle body frame.

Furthermore, by deforming the easily deformable portion downward, interference of the easily deformable portion 161 with the battery module 82 (that is, the plurality of batteries 85), the water cooling pipe, or the like can be avoided.

Additionally, as described in FIGS. 2 and 4, by arranging the inclined member 48 below the right end portion 45a of the right second floor cross member 45, the inclined closed cross section 49 is formed larger than the cross-member inclined closed cross section 47. Therefore, for example, the inclined member 48 can be deformed in a manner of being bent downward with respect to the right second floor cross member 45 under the side collision load F1 input by the side collision. Accordingly, the side collision energy generated by the side collision can be absorbed by the inclined member 48.

Similar to the right second floor cross member 45, each of the left second floor cross member 45, the right third floor cross member 46, and the left third floor cross member 46 is also provided with an inclined member 48 below. Therefore, for example, the inclined member 48 can be deformed in a manner of being bent downward with respect to the left second floor cross member 45, the right third floor cross member 46, and the left third floor cross member 46 under the side collision load F1 input by the side collision. Accordingly, the side collision energy generated by the side collision can be absorbed by the inclined member 48.

It should be noted that the technical scope of the disclosure is not limited to the above embodiment, and various modifications can be made without departing from the spirit of the disclosure.

In addition, it is possible to replace the component elements in the embodiment with well-known components as appropriate without departing from the spirit of the disclosure, and the modifications described above may be appropriately combined.

According to this configuration, the plurality of batteries are arranged vertically with the longitudinal direction directed toward the front-rear direction of the vehicle body. Therefore, the width of a battery module constituted of the plurality of batteries in the vehicle width direction can be kept small. Accordingly, a deformation allowable space (sometimes referred to as collision stroke space) can be set between a longitudinal frame (a left frame 104, a right frame 103) and the batteries (85). For example, when a load (hereinafter referred to as side collision load) is input to the side of the vehicle by a side collision, an impact energy can be absorbed by setting a large deformation allowable space (collision stroke space) generated by the side collision load and deforming the longitudinal frame (the left frame 104, the right frame 103).

Furthermore, by increasing the length of the battery module constituted of the plurality of batteries in the front-rear direction of the vehicle body, the center of gravity of pack (Gi) of the battery pack is arranged at the rear of the center of gravity of vehicle (Gb) of the entire vehicle (including all parts of the vehicle, such as the vehicle body, a motor, the battery, or the like) in the vehicle body. Accordingly, a rotational moment applied on the battery module that is generated by the side collision load input to the side of the vehicle can be set small.

In this way, by setting the collision stroke space to be large and the rotational moment generated by the side collision load to be small, for example, the reinforcement of the vehicle body can be reduced, and the deformation of the battery pack can thus be suppressed without increasing the weight of the vehicle body.

The vehicle equipped with a battery pack may include: a front side frame (for example, left and right front side frames 36 in the embodiment) arranged in front of the battery pack in the vehicle body and extending in the front-rear direction of the vehicle body; and a rear frame (for example, left and right rear frames 41 in the embodiment) arranged at the rear of the battery pack in the vehicle body and extending in the front-rear direction of the vehicle body. The battery pack may include a battery module (for example, a battery module 82 in the embodiment) constituted of the plurality of batteries. An outer end portion (for example, a right outer end portion 82c and a left outer end portion 82d in the embodiment) of the battery module in the vehicle width direction may be arranged on an extension line (for example, extension lines 151, 152 in the embodiment) of at least one of the front side frame and the rear frame.

According to this configuration, the outer end portion of the battery module in the vehicle width direction is arranged on the extension line of at least one of the front side frame and the rear frame. Therefore, for example, when front wheels or rear wheels move toward the battery pack under a load input by a small overlap collision (hereinafter referred to as small collision load), the battery module can be protected by the front side frame and the rear frame.

Accordingly, the vehicle body deformed by the movement of the front wheels or the rear wheels and an outer frame of the battery pack (battery case) can be suppressed from interfering with the battery module (that is, the batteries).

The vehicle equipped with a battery pack may include: a longitudinal frame (for example, a first longitudinal frame 94 and a second longitudinal frame 95 in the embodiment) that is extended toward the front-rear direction of the vehicle body on a bottom surface (for example, a case bottom 108 in the embodiment) of the battery pack and supports the batteries; and a branch portion (for example, left and right branch portions 38 in the embodiment) extending from a rear end portion (for example, a bent portion 36a in the embodiment) of the front side frame toward the rear of the vehicle body.

The branch portion may be coupled to a front end portion (for example, a front end portion 94a in the embodiment) of the longitudinal frame.

According to this configuration, the longitudinal frame is arranged on the bottom surface of the battery pack. In addition, the branch portion is extended from the rear end portion of the front side frame and coupled to the front end portion of the longitudinal frame. Therefore, a load input to the front side frame by a frontal collision (hereinafter referred to as frontal collision load) can be supported by the longitudinal frame through the branch portion. Accordingly, for example, the weight of a vehicle body frame (framework member) such as a side sill or the like arranged on the outer side of the vehicle body in the vehicle width direction can be reduced.

The vehicle equipped with a battery pack may include a longitudinal frame (for example, the second longitudinal frame 95 in the embodiment) that is extended toward the front-rear direction of the vehicle body on the bottom surface of the battery pack and supports the batteries. A rear end portion (for example, a rear end portion 95*a* in the embodiment) of the longitudinal frame may be arranged on an extension line (for example, the extension lines 151, 152 in the embodiment) of the rear frame.

According to this configuration, the rear end portion of the longitudinal frame is arranged on the extension line of the rear frame. Therefore, a load input to the rear frame by a rear collision (hereinafter referred to as rear collision load) can be supported by the longitudinal frame through the rear frame. Accordingly, for example, the weight of the vehicle body frame (framework member) such as the side sill or the like arranged on the outer side of the vehicle body in the vehicle width direction can be reduced.

The battery pack may include: a battery module (for example, the battery module 82 in the embodiment) constituted of the plurality of batteries; an outer longitudinal frame (for example, the first longitudinal frame 94 and the second longitudinal frame 95 in the embodiment) that is extended toward the front-rear direction of the vehicle body on the outer side of the battery module in the vehicle width direction and supports the battery module; and an easily deformable portion (for example, an easily deformable portion 161 in the embodiment) that is arranged on the outer side of the outer longitudinal frame in the vehicle width direction and is deformable under a load of the side collision (for example, a side collision load F1 in the embodiment).

According to this configuration, the outer longitudinal frame is extended toward the front-rear direction of the vehicle body on the outer side of the battery module in the vehicle width direction. Furthermore, the easily deformable portion is arranged on the outer side of the outer longitudinal frame in the vehicle width direction. Therefore, the side collision energy can be absorbed by the easily deformable portion by deforming the easily deformable portion under the side collision load input by the side collision.
Accordingly, for example, the need for the reinforcement of the vehicle body frame (framework member) such as the side sill or the like arranged on the outer side of the vehicle body in the vehicle width direction can be eliminated, and the weight of the vehicle body frame can thus be reduced.

The easily deformable portion may be deformed downward.

According to this configuration, by deforming the easily deformable portion downward, interference of the easily deformable portion with, for example, the battery accommodated in the battery pack can be avoided.

The battery pack may include: a frame portion (for example, a case frame portion 91 in the embodiment) covering the outer periphery of the battery module (for example, the battery module 82 in the embodiment) constituted of the plurality of batteries; a case portion (for example, a case portion 92 in the embodiment) arranged below the battery module inside the frame portion; a front longitudinal frame (for example, the first longitudinal frame 94 in the embodiment) and a rear longitudinal frame (for example, the second longitudinal frame 95 in the embodiment) that are arranged at intervals along the case portion in the front-rear direction of the vehicle body and directed toward the front-rear direction of the vehicle body; and a cross member (for example, a lower cross member 93 in the embodiment) that is arranged between the front longitudinal frame and the rear longitudinal frame and extended toward the vehicle width direction.

According to this configuration, the front longitudinal frame and the rear longitudinal frame are arranged at intervals along the case portion in the front-rear direction of the vehicle body and directed toward the front-rear direction of the vehicle body. Furthermore, the cross member is arranged between the front longitudinal frame and the rear longitudinal frame. Therefore, in case regions in front of and at the rear of the cross member in the vehicle body, the longitudinal battery can be arranged vertically toward the front-rear direction of the vehicle body along the front longitudinal frame and the rear longitudinal frame. Accordingly, the longitudinal batteries can be arranged vertically in an efficient manner, and a sufficient cruising range can thus be secured.

The battery pack may include, above the plurality of batteries placed on the front longitudinal frame and the rear longitudinal frame, an upper cross member (for example, an upper cross member 96 in the embodiment) that is arranged along the cross member and fixes the plurality of batteries from above.

According to this configuration, the plurality of batteries are placed on the front longitudinal frame and the rear longitudinal frame. Furthermore, the plurality of batteries are fixed by the upper cross member from above. Accordingly, the longitudinal batteries can be fixed stably.

The vehicle equipped with a battery pack may include: a floor panel arranged above the battery pack (for example, a floor panel 23 in the embodiment); and floor longitudinal frames (for example, first to fourth floor longitudinal frames 55 to 58 in the embodiment) that are extended toward the front-rear direction of the vehicle body and fix the battery pack at positions on the floor panel that are located in front of and at the rear of the center of gravity of pack in the vehicle body and aligned in the vehicle width direction with respect to the center of gravity of pack.

According to this configuration, the floor longitudinal frames are extended toward the front-rear direction of the vehicle body at the positions aligned in the vehicle width direction with respect to the center of gravity of pack, and the battery pack is fixed by the floor longitudinal frames. Accordingly, the positions aligned in the vehicle width direction with respect to the center of gravity of pack of the battery pack can be supported by the floor longitudinal frames, and the rigidity and strength of the floor panel can thus be secured.

On the floor panel, a plurality of the floor longitudinal frames may be arranged at internals in the vehicle width direction on a first floor portion (for example, a first floor portion 33 in the embodiment) on one side in the vehicle width direction and a second floor portion (for example, a second floor portion 34 in the embodiment) on the other side in the vehicle width direction. The floor panel may have a footrest (for example, a first front footrest 61, a second front footrest 63, a first rear footrest 62, and a second rear footrest 64 in the embodiment) for an occupant (for example, occupants 66 to 69 in the embodiment) seated in a seat in at least one of a portion in the vehicle body front of the battery pack and a portion between the floor longitudinal frames.

According to this configuration, on the floor panel, the footrest for the occupant seated in the seat is arranged in at least one of the portion in the vehicle body front of the battery pack and the portion between the floor longitudinal frames.

Here, the portion in the vehicle body front of the battery pack can be lowered below the battery pack. In addition, the portion between the floor longitudinal frames can be lowered to a position close to the battery pack. Accordingly, by using the portion in the vehicle body front of the battery pack and the portion between the floor longitudinal frames as the footrest for the occupant, an interior space can be effectively utilized even in a compact car, and a large interior space can be secured.

The vehicle equipped with a battery pack may include: side sills (for example, left and right side sills 31 in the embodiment) that are arranged on the outer side of the floor panel in the vehicle width direction and extend in the front-rear direction of the vehicle body; floor cross members (for example, a second floor cross member 45 and a third floor cross member 46 in the embodiment) which are coupled to the floor longitudinal frames and in which end portions (for example, a right end portion 45a, a cross member right end portion 45a, a left end portion 45c, a cross member left end portion 45c, a right end portion 46c, a cross member right end portion 46a, a left end portion 46c, and a cross member left end portion 46c in the embodiment) are inclined downward toward the outer side in the vehicle width direction to the side sills; and an inclined member (for example, an inclined member 48 in the embodiment) arranged below the floor panel in a manner of sandwiching the floor panel together with the end portions of the floor cross members. The inclined member may form a closed cross section (for example, an inclined closed cross section 49 in the embodiment) to the side sill together with the floor panel.

According to this configuration, the floor cross member is coupled to the floor longitudinal frame and extended to the side sill, and the end portion of the floor cross member is inclined downward toward the outer side in the vehicle width direction.

Furthermore, the inclined member is arranged below the floor panel, and the closed cross section extending to the side sill is formed by the inclined member and the floor panel. Therefore, a portion of the floor panel in the vicinity of the side sill can be reinforced by the floor cross member and the inclined member.

The reason for reinforcing the portion of the floor panel in the vicinity of the side sill is as follows. For example, it is desirable to form the floor panel along the upper edge of the side sill to facilitate the entry and exit of the occupants. However, if the floor panel is formed along the upper edge of the side sill, it is difficult to secure the rigidity and strength of the portion in the vicinity of the side sill against the side collision load input by the side collision.

Therefore, the rigidity and strength of the portion of the floor panel in the vicinity of the side sill is secured by reinforcing the floor cross member and the inclined member.

Accordingly, for example, even when the floor panel is formed along the upper edge of the side sill to facilitate the entry and exit of the occupants, the side collision load input by the side collision can be supported by the floor cross member and the inclined member.

Moreover, even if the seat, to which the weight of the occupant is applied, is brought close to the vicinity of the side sill and attached to the floor cross member, the seat can be supported on the inner surface of the side sill by the inclined member.

The closed cross section formed by the inclined member and the floor panel may be larger than a closed cross section (for example, a cross-member inclined closed cross section 47 in the embodiment) formed by the floor cross member and the floor panel.

According to this configuration, the closed cross section of the inclined member is formed larger than the closed cross section of the floor cross member.

Therefore, the inclined member can be deformed so as to be bent downward with respect to the floor cross member by the side collision load input by the side collision.

Accordingly, the side collision energy generated by the side collision can be absorbed by the inclined member.

The battery pack may include: a battery module (for example, the battery module 82) in which a plurality of batteries (for example, the batteries 85 in the embodiment) are arranged in the vehicle width direction, the battery having a plurality of battery cells stacked in the front-rear direction of the vehicle body and the longitudinal direction of the battery being directed toward the front-rear direction of the vehicle body; and a battery accessory (for example, a battery accessory 83 in the embodiment) arranged above the center of the battery module in the vehicle width direction.

According to this configuration, the battery accessory is arranged above the center of the battery module in the vehicle width direction. Therefore, the size of the battery module in the vehicle width direction can be kept small without impairing the capacity of the battery. Accordingly, for example, a large collision stroke space that allows deformation caused by the side collision load input by the side collision can be set.

The battery pack may include: a battery module (for example, the battery module 82 in the embodiment) in which a plurality of batteries (for example, the batteries 85 in the embodiment) are arranged in the vehicle width direction and at least one pair of batteries is arranged in the front-rear direction of the vehicle body, the battery having a plurality of battery cells stacked in the front-rear direction of the vehicle body and the longitudinal direction of the battery being directed toward the front-rear direction of the vehicle body; and an electric wiring (for example, an electric wiring 84 in the embodiment) arranged in a space in at least one of a first boundary portion (for example, a first boundary portion 121 in the embodiment) extending between the batteries in the vehicle width direction and a second boundary portion (for example, a second boundary portion 122 in the embodiment) extending in the front-rear direction of the vehicle body in the battery module. The floor cross member may be arranged at the first boundary portion in the front-rear direction of the vehicle body.

According to this configuration, in the battery module, the electric wiring is arranged in the space in at least one of the first boundary portion extending between the batteries in the vehicle width direction and the second boundary portion extending in the front-rear direction of the vehicle body.

Here, for example, in the battery module in which the plurality of batteries are arranged in the vehicle width direction and a pair of batteries are arranged in the front-rear direction of the vehicle body, the terminals of the batteries can be arranged toward the first boundary portion. Therefore, in the space in the first boundary portion, each terminal can be concentrated in the center of the battery pack by passing a wire in the vehicle width direction while connecting each battery toward the center of the vehicle width direction.

Furthermore, the floor cross member is arranged at the first boundary portion in the front-rear direction of the vehicle body. Therefore, electrical components such as the terminals, the electric wiring, or the like arranged at the first boundary portion can be protected from, for example, the side collision load input by the side collision. Accordingly, because it is not required to arrange the electric wiring and the terminals on the outer side of the battery module in the vehicle width direction, for example, a large collision stroke space that allows deformation caused by the side collision load input by the side collision can be set.

Here, for example, the battery pack is provided with an upper cross member above the first boundary portion. Therefore, each terminal concentrated in the center of the battery pack is pulled out above the upper cross member and is connected to a high-voltage component part such as the battery accessory arranged in the front-rear direction of the vehicle body, and the wire is passed to the front of the vehicle body to arrange the high voltage wiring, and thereby the wire can be shortened. By shortening the wire, cost reduction and weight reduction can be achieved. In addition, because the wire is passed through a highly rigid portion of the battery pack provided with the upper cross member, damage to the wiring can be suppressed when the vehicle body (specifically, the battery pack) vibrates.

According to the disclosure, by setting a large collision stroke space and changing the side collision load into the rotational moment, the deformation of the battery pack can be suppressed without increasing the weight of the vehicle body.

What is claimed is:

1. A vehicle equipped with a battery pack, which comprises, under a floor of the vehicle, the battery pack having a plurality of batteries, wherein a longitudinal direction of each of the plurality of batteries is parallel to a front-rear direction of a vehicle body of the vehicle,
   wherein in the battery pack, a center of gravity of the battery pack is located at the rear of a center of gravity of the vehicle in the front-rear direction,
   wherein the battery pack comprises:
   a battery module comprising the plurality of batteries;
   an outer longitudinal frame that is extended in the front-rear direction of the vehicle body on an outer side of the battery module in a vehicle width direction and supports the battery module; and
   a deformable portion that is arranged on an outer side of the outer longitudinal frame in the vehicle width direction,
   wherein the battery pack has a case body on an outer side of the deformable portion in the vehicle width direction, the case body is provided on an outer side of a floor panel in the vehicle width direction, and the floor panel is arranged above the battery pack and attached to side sills extending in the front-rear direction.

2. The vehicle equipped with a battery pack according to claim 1, comprising:
   a front side frame arranged in front of the battery pack in the vehicle body and extending in the front-rear direction of the vehicle body; and
   a rear frame arranged at the rear of the battery pack in the front-rear direction and extending in the front-rear direction of the vehicle body,
   an outer end portion of the battery module in the vehicle width direction is arranged on an extension line of at least one of the front side frame and the rear frame.

3. The vehicle equipped with a battery pack according to claim 2, comprising:
   a longitudinal frame that is extended toward the front-rear direction of the vehicle body on a bottom surface of the battery pack and supports the plurality of batteries; and
   a branch portion connecting to a rear end portion of the front side frame and extending from the rear end portion of the front side frame in the rear of the vehicle body,
   wherein the branch portion is coupled to a front end portion of the longitudinal frame.

4. The vehicle equipped with a battery pack according to claim 2, comprising:
   a longitudinal frame that is extended in the front-rear direction of the vehicle body on a bottom surface of the battery pack and supports the plurality of batteries,
   wherein a rear end portion of the longitudinal frame is arranged on an extension line of the rear frame.

5. The vehicle equipped with a battery pack according to claim 3, comprising:
   wherein a rear end portion of the longitudinal frame is arranged on an extension line of the rear frame.

6. The vehicle equipped with a battery pack according to claim 1, wherein the case body comprises:
   a frame portion covering an outer periphery of the battery module comprising the plurality of batteries;
   a case portion arranged below the battery module inside the frame portion;
   a front longitudinal frame and a rear longitudinal frame that are arranged along the case portion in the front-rear direction of the vehicle body and directed in the front-rear direction of the vehicle body, wherein the front longitudinal frame and the rear longitudinal frame are spaced apart from each other; and
   a cross member that is arranged between the front longitudinal frame and the rear longitudinal frame and extended in the vehicle width direction.

7. The vehicle equipped with a battery pack according to claim 2, wherein the case body comprises:
   a frame portion covering an outer periphery of the battery module comprising the plurality of batteries;
   a case portion arranged below the battery module inside the frame portion;
   a front longitudinal frame and a rear longitudinal frame that are arranged along the case portion in the front-rear direction of the vehicle body and directed in the front-rear direction of the vehicle body, wherein the front longitudinal frame and the rear longitudinal frame are spaced apart from each other; and
   a cross member that is arranged between the front longitudinal frame and the rear longitudinal frame and extended in the vehicle width direction.

8. The vehicle equipped with a battery pack according to claim 3, wherein the case body comprises:
   a frame portion covering an outer periphery of the battery module comprising the plurality of batteries;
   a case portion arranged below the battery module inside the frame portion;
   a front longitudinal frame and a rear longitudinal frame that are arranged along the case portion in the front-rear direction of the vehicle body and directed in the front-rear direction of the vehicle body, wherein the front longitudinal frame and the rear longitudinal frame are spaced apart from each other; and a cross member that is arranged between the front longitudinal frame and the rear longitudinal frame and extended in the vehicle width direction.

9. The vehicle equipped with a battery pack according to claim 6,
wherein the battery pack comprises, above the plurality of batteries placed on the front longitudinal frame and the rear longitudinal frame, an upper cross member that is arranged along the cross member, wherein the plurality of batteries are attached on a bottom side of the upper cross member.

10. The vehicle equipped with a battery pack according to claim 1, comprising:
floor longitudinal frames that are extended in the front-rear direction of the vehicle body at positions on the floor panel that are located in front of and at the rear of the center of gravity of the battery pack in the front-rear direction and aligned in the vehicle width direction with respect to the center of gravity of the battery pack, wherein the battery pack is attached on the floor longitudinal frames.

11. The vehicle equipped with a battery pack according to claim 10,
wherein on the floor panel, a plurality of the floor longitudinal frames are arranged in the vehicle width direction on a first floor portion on one side in the vehicle width direction and a second floor portion on the other side in the vehicle width direction, wherein the floor longitudinal frames are spaced apart from each other, and
the floor panel has a footrest for an occupant in at least one of a portion in front of the battery pack in the front-rear direction and a portion between any two of the floor longitudinal frames.

12. The vehicle equipped with a battery pack according to claim 10, comprising:
the side sills that are arranged on the outer side of the floor panel in the vehicle width direction;
floor cross members which are coupled to the floor longitudinal frames and in which end portions are inclined downward toward the outer side in the vehicle width direction to the side sills; and
an inclined member arranged below the floor panel, wherein the floor panel is sandwiched between the end portions of the floor cross members and the inclined member,
wherein the inclined member forms a closed cross section to the side sills together with the floor panel.

13. The vehicle equipped with a battery pack according to claim 12, wherein the closed cross section formed by the inclined member and the floor panel is larger than a closed cross section formed by the floor cross members and the floor panel.

14. The vehicle equipped with a battery pack according to claim 1, wherein the battery pack comprises:
a battery module in which a plurality of batteries are arranged in the vehicle width direction, the battery having a plurality of battery cells stacked in the front-rear direction of the vehicle body and the longitudinal direction of the battery being directed toward the front-rear direction of the vehicle body; and
a battery accessory arranged above the center of the battery module in the vehicle width direction.

15. The vehicle equipped with a battery pack according to claim 12, wherein the battery pack comprises:
the battery module in which the plurality of batteries are arranged in the vehicle width direction and at least one pair of the plurality of batteries is arranged in the front-rear direction of the vehicle body, each of the plurality of batteries having a plurality of battery cells stacked in the front-rear direction of the vehicle body and the longitudinal direction of each of the plurality of batteries being directed in the front-rear direction of the vehicle body; and
an electric wiring arranged in a space in at least one of a first boundary portion and a second boundary portion in the battery module, wherein the first boundary portion extends between the plurality of batteries in the vehicle width direction and the second boundary portion extends in the front-rear direction of the vehicle body,
wherein the floor cross members are in front of the first boundary portion in the front-rear direction of the vehicle body or the first boundary portion is in front of the floor cross member in the front-rear direction of the vehicle body.

16. A vehicle equipped with a battery pack, which comprises, under a floor of the vehicle, the battery pack having a plurality of batteries, wherein a longitudinal direction of each of the plurality of batteries is parallel to a front-rear direction of a vehicle body of the vehicle,
wherein in the battery pack, a center of gravity of the battery pack is located at the rear of a center of gravity of the vehicle in the front-rear direction,
wherein the battery pack comprises:
a frame portion covering an outer periphery of the battery module comprising the plurality of batteries;
a case portion arranged below the battery module inside the frame portion;
a front longitudinal frame and a rear longitudinal frame that are arranged along the case portion in the front-rear direction of the vehicle body and directed in the front-rear direction of the vehicle body, wherein the front longitudinal frame and the rear longitudinal frame are spaced apart from each other; and
a cross member that is arranged between the front longitudinal frame and the rear longitudinal frame and extended in the vehicle width direction,
wherein the plurality of batteries are placed on the front longitudinal frame and the rear longitudinal frame, and above the plurality of batteries placed on the front longitudinal frame and the rear longitudinal frame, an upper cross member that is arranged along the cross member, wherein the plurality of batteries are attached on a bottom side of the upper cross member.

17. A vehicle equipped with a battery pack, which comprises, under a floor of the vehicle, the battery pack having a plurality of batteries, wherein a longitudinal direction of each of the plurality of batteries is parallel to a front-rear direction of a vehicle body of the vehicle,
wherein in the battery pack, a center of gravity of the battery pack is located at the rear of a center of gravity of the vehicle in the front-rear direction,
wherein the vehicle further comprises:
a floor panel arranged above the battery pack;
floor longitudinal frames that are extended in the front-rear direction of the vehicle body at positions on the floor panel that are located in front of and at the rear of the center of gravity of the battery pack in the front-rear direction and aligned in a vehicle width direction with respect to the center of gravity of the battery pack, wherein the battery pack is attached on the floor longitudinal frames;

side sills that are arranged on an outer side of the floor panel in the vehicle width direction and extend in the front-rear direction of the vehicle body;
floor cross members which are coupled to the floor longitudinal frames and in which end portions are inclined downward toward the outer side in the vehicle width direction to the side sills; and
an inclined member arranged below the floor panel, wherein the floor panel is sandwiched between the end portions of the floor cross members and the inclined member,
wherein the inclined member forms a closed cross section to the side sill together with the floor panel.

* * * * *